(12) United States Patent
Jain et al.

(10) Patent No.: US 9,494,734 B1
(45) Date of Patent: Nov. 15, 2016

(54) ARTICLE AND METHOD FOR IMPLEMENTING ELECTRONIC DEVICES ON A SUBSTRATE USING QUANTUM DOT LAYERS

(71) Applicants: Faquir Chand Jain, Storrs, CT (US); John Zeller, Albany, NY (US)

(72) Inventors: Faquir Chand Jain, Storrs, CT (US); John Zeller, Albany, NY (US)

( * ) Notice: Subject to any disclaimer, the term of this patent is extended or adjusted under 35 U.S.C. 154(b) by 46 days.

(21) Appl. No.: 13/953,524

(22) Filed: Jul. 29, 2013

Related U.S. Application Data

(60) Provisional application No. 61/676,639, filed on Jul. 27, 2012.

(51) Int. Cl.
| | | |
|---|---|---|
| G02B 6/10 | (2006.01) | |
| G02F 1/035 | (2006.01) | |
| G02F 1/017 | (2006.01) | |
| B82Y 20/00 | (2011.01) | |

(52) U.S. Cl.
CPC .............. *G02B 6/10* (2013.01); *G02F 1/01708* (2013.01); *G02F 1/035* (2013.01); *B82Y 20/00* (2013.01); *G02F 2001/01791* (2013.01); *Y10S 977/774* (2013.01); *Y10S 977/932* (2013.01)

(58) Field of Classification Search
None
See application file for complete search history.

(56) References Cited

U.S. PATENT DOCUMENTS

| | | | | |
|---|---|---|---|---|
| 6,052,400 A | * | 4/2000 | Nanbu et al. .......... | B82Y 20/00 372/11 |
| 6,771,410 B1 | * | 8/2004 | Bourlanoff et al. ... | B82Y 20/00 359/245 |
| 2004/0085612 A1 | * | 5/2004 | Livingston et al. ... | B82Y 10/00 359/279 |
| 2005/0058415 A1 | * | 3/2005 | Lee et al. .............. | B82Y 10/00 385/122 |
| 2005/0078902 A1 | * | 4/2005 | Beausoleil et al. .... | B82Y 20/00 385/1 |
| 2005/0117868 A1 | * | 6/2005 | Chen et al. ............ | B82Y 15/00 385/143 |
| 2005/0157368 A1 | * | 7/2005 | Vang et al. ............ | B82Y 10/00 359/248 |
| 2006/0051014 A1 | * | 3/2006 | Noda et al. ............ | B82Y 20/00 385/24 |
| 2006/0067602 A1 | * | 3/2006 | Todori et al. .......... | B82Y 10/00 385/8 |
| 2006/0279829 A1 | * | 12/2006 | Dohrman et al. ..... | B82Y 20/00 359/241 |
| 2007/0280592 A1 | * | 12/2007 | Furuya et al. ......... | B82Y 20/00 385/27 |
| 2009/0022446 A1 | * | 1/2009 | Hoshi ..................... | G02F 1/025 385/3 |
| 2009/0173934 A1 | * | 7/2009 | Jain ........................ | G11C 11/56 257/20 |

FOREIGN PATENT DOCUMENTS

| | | | |
|---|---|---|---|
| EP | 2568328 A2 | * | 3/2013 |
| JP | 2003-66386 A | * | 3/2003 |

* cited by examiner

*Primary Examiner* — Mike Stahl
(74) *Attorney, Agent, or Firm* — Steven H. McHugh

(57) ABSTRACT

Novel use of a cladded quantum dot array layer serving as a waveguide channel by sandwiching it between two cladding layers comprised of lower index of refraction materials is described to form Si nanophotonic devices and integrated circuits. The photonic device structure is compatible with Si nanoelectronics using conventional, quantum dot gate (QDG), and quantum dot channel (QDC) FET based logic, memories, and other integrated circuits.

19 Claims, 39 Drawing Sheets

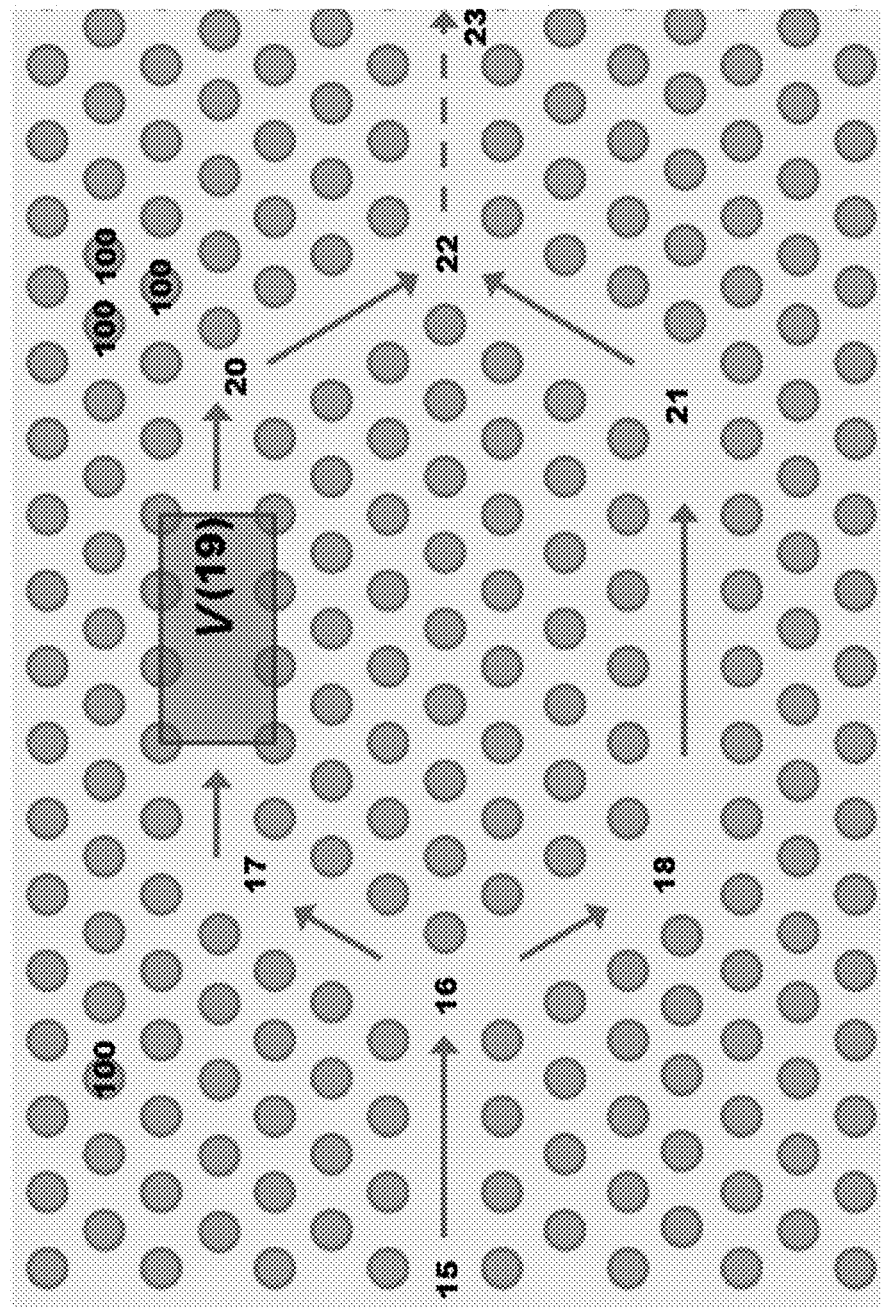

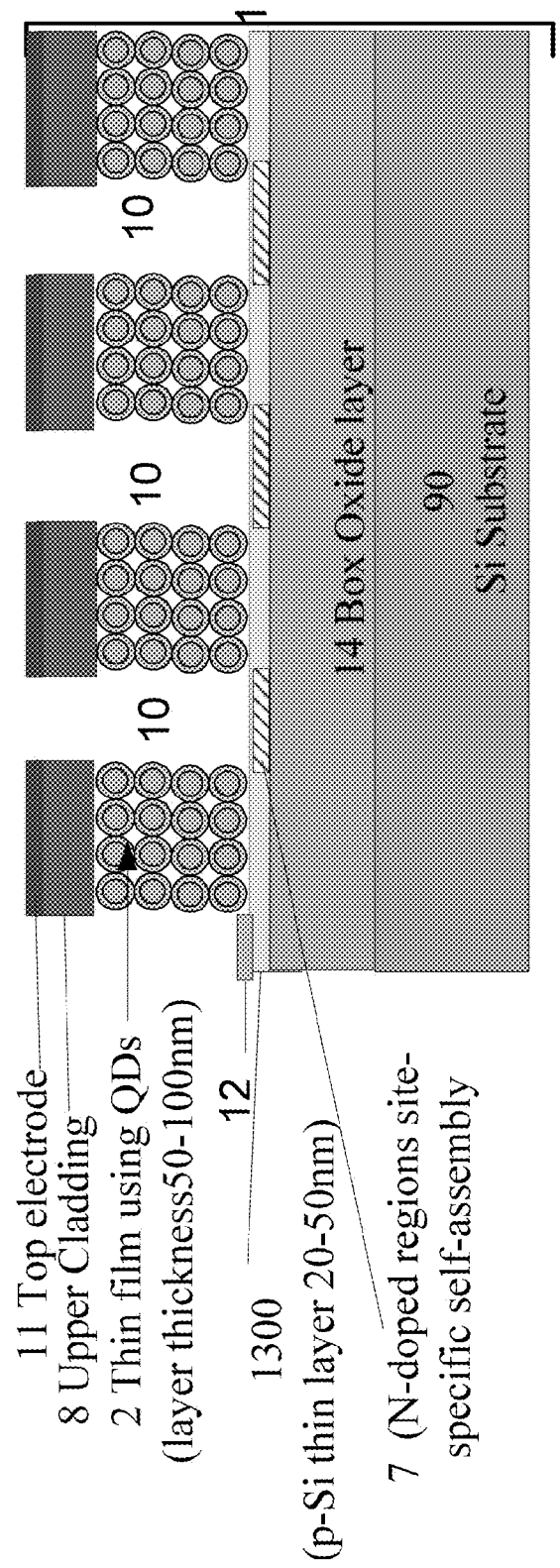

ARTICLE AND METHOD FOR IMPLEMENTING ELECTRONIC DEVICES ON A SUBSTRATE USING QUANTUM DOT LAYERS

CROSS REFERENCE TO RELATED APPLICATIONS

This application claims benefit of the filing data of U.S. Provisional Patent Application Ser. No. 61/676,639, filed Jul. 27, 2012, the contents of which are incorporated by reference herein in its entirety.

STATEMENT REGARDING FEDERALLY SPONSORED RESEARCH

The United States Government has certain rights in this invention pursuant to Office of Naval Research (ONR) Grant No. N00014-06-1-0016.

FIELD OF THE INVENTION

The present invention relates generally to the implementation of electronic devices on a substrate and more particularly to the use of Quantum Dot Layers to implement electronic devices on a substrate, including Si nanophotonics, photonic crystal and photonic band gap waveguides, quantum dot waveguides and claddings, Mach-Zehnder interferometer and directional coupler optical modulators, and multiplexers and demultiplexers.

BACKGROUND OF THE INVENTION

Silicon nanophotonic waveguides implemented in conventional and photonic crystal configurations have been used to implement compact optical modulators and other devices. Integration of waveguides, photodetectors and modulators enables realization of photonic integrated circuits. However, once fabricated it is generally difficult to tune the waveguides and other components.

SUMMARY OF THE INVENTION

A photonic waveguide having three layers is provided and includes a top layer having a top layer index of refraction (TIOR); a bottom layer having a bottom layer index of refraction (BIOR); and a middle layer, wherein the middle layer includes a middle layer effective index of refraction (MIOR) that is greater than the TIOR and the BIOR and regions adjacent to it vertically as well as laterally, wherein the top layer, bottom layer and middle layer are deposited on a substrate which is selected from at least one of Si, Ge, Si-on-Insulator, Si-on-sapphire, GaAs, InP, ZnSe, LiNbO3 and any material with similar characteristics of at least one of Si, Ge, Si-on-Insulator, Si-on-sapphire, GaAs, InP, ZnSe, LiNbO3, wherein the middle layer serves as the waveguiding layer where photons are confined in the transverse and lateral directions by regions characterized by at least one of a lower index of refraction and photonic crystal structure which includes two-dimensional or three-dimensional lattice photonic crystals, and wherein the middle layer is constructed of an array of cladded quantum dots, wherein the cladded quantum dots have a core with a diameter in the range of about 3 nm to about 5 nm and a cladding of higher energy gap and lower index of refraction material in the range of about 1 nm to about 3 nm, wherein the middle waveguide layer optical parameters include an effective index of refraction, coefficient of absorption at a given light wavelength, wherein their magnitude is at least partially dependent on at least one of a relative core diameter, cladding thickness and the materials of quantum dots comprising the middle layer, wherein the middle layer optical parameters can be altered by applying an external voltage and associated electric field, and wherein the core is selected from at least one of Si, Ge, Si, combination of Si and Ge, II-VI and III-V semiconductors, and any combination thereof, and wherein the cladding on the quantum dot is selected from at least one of SiOx, GeOx, II-VI and III-V materials, and any combination thereof, and wherein the top layer deposited above the middle layer is constructed from a material selected from at least one of SiO2, Si3N4, SiON, and any suitable lower index of refraction and higher energy gap materials, and wherein the bottom layer below the middle layer is constructed from a material selected from at least one of SiO2, Si3N4, SiON, and any suitable lower index of refraction and higher energy gap materials, and wherein the cladding layers incorporating an electrode material layer for the purpose of applying an external voltage bias and/or signal for modulation, the top cladding layer is deposited with an electrode layer to apply external voltages, the substrate or bottom cladding layer incorporating a deposited electrode through which to apply the the external electric field, the waveguiding structure comprising of middle waveguide layer, top and bottom cladding layer realized in conjunction with either lower index refraction cladding regions or photonic crystal structure along the two lateral sides adjoining the waveguiding structure.

A nanophotonic waveguide is provided and includes three layers, a middle layer having an effective index of refraction higher than the upper and bottom cladding layers and regions adjacent to it vertically as well as laterally, the three layers are deposited on a substrate which is selected from Si, Ge, Si-on-Insulator, Si-on-sapphire, GaAs, InP, ZnSe, and LiNbO3, the middle layer serving as the waveguiding layer where photons are confined in the transverse and lateral directions by lower index of refraction regions or photonic crystal structure comprising of 2-dimensional or 3-dimensional lattice photonic band gap structures, the middle waveguing layer is made of semiconductor selected from Si, Ge, $Si_xGe_{1-x}$, III-VI and II-VI semiconductors, the three layers forming the waveguide are surrounded in the lateral direction by a layer or regions comprised of cladded quantum dot layer, the quantum dot array having a core with diameter in the range of 3-5 nm and a cladding of higher energy gap and lower index of refraction material in the range of 1-3 nm, the quantum dot layer (adjoining the middle, upper and lower waveguide structure) having its optical parameters including effective index of refraction, coefficient of absorption at given light wavelength depend on relative core diameter, cladding thickness and the materials of quantum dots comprising the middle layer, the adjoining layer optical parameters can be altered by applying an external voltage and its associated electric field, the core of the quantum dot layer is selected from Si, Ge, Si, combination of Si and Ge, II-VI and III-V semiconductors, the cladding on quantum dot is selected from $SiO_x$, $GeO_x$, II-VI and III-V materials, the quantum dot layers having on top an electrode material layer for the purpose of applying an external voltage bias and/or signal for modulation, the quantum dot layers having on bottom side an electrode material layer for the purpose of applying an external voltage bias and/or signal for modulation, the electrode material layer on bottom side of quantum dot layer could be deposited on the bottom side of substrate to apply the said external electric field.

A nano-photonic waveguide is provided and includes three layers, a middle layer having an effective index of refraction higher than those of the top and bottom cladding layers and regions adjacent to it vertically as well as laterally, the three layers are deposited on a substrate which is selected from Si, Ge, Si-on-Insulator, Si-on-sapphire, GaAs, InP, ZnSe, and LiNbO3 the middle layer serving as the waveguiding layer where photons are confined in the transverse and lateral directions by regions characterized by lower index of refraction or photonic crystal structure comprising of two-dimensional or three-dimensional lattice photonic crystals, the middle waveguiding layer is composed of an array of cladded quantum dots, the quantum dot array having a core with diameter in the range of 3-5 nm and a cladding of higher energy gap and lower index of refraction material in the range of 1-3 nm, the middle waveguide layer optical parameters including effective index of refraction, coefficient of absorption at given light wavelength, wherein their magnitude is dependent on relative core diameter, cladding thickness and the materials of quantum dots comprising the middle layer, the middle layer optical parameters can be altered by applying an external voltage and associated electric field, the core is selected from Si, Ge, Si, combination of Si and Ge, II-VI and III-V semiconductors, the cladding on quantum dot is selected from SiOx, GeOx, II-VI and III-V materials, a top cladding layers deposited above the middle waveguide layer is selected from $SiO_2$, $Si_3N_4$, SiON, and lower index of refraction and higher energy gap materials, a bottom cladding layer below the middle layer having its material selected from $SiO_2$, $Si_3N_4$, SiON, and lower index of refraction and higher energy gap materials, the cladding layers incorporating an electrode material layer for the purpose of applying an external voltage bias and/or signal for modulation, the top cladding layer is deposited with an electrode layer to apply external voltages, the substrate or bottom cladding layer incorporating a deposited electrode through which to apply the the external electric field, the waveguiding structure comprising of middle waveguide layer, top and bottom cladding layer realized in conjunction with either lower index refraction cladding regions or photonic crystal structure along the two lateral sides adjoining the waveguiding structure.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike in the several Figures:

FIG. 4f is a graphical image showing the topology of a Mach-Zehnder modulator in photonic crystal version, in accordance with an embodiment of the invention.

FIG. 14 is a schematic block diagram illustrating a photonic device using quantum dot waveguiding layer using SOI substrate where box oxide serves as the lower (or bottom) cladding layer 6 (see FIG. 4b), in accordance with an embodiment of the invention.

DETAILED DESCRIPTION OF THE INVENTION

Figure 1A:
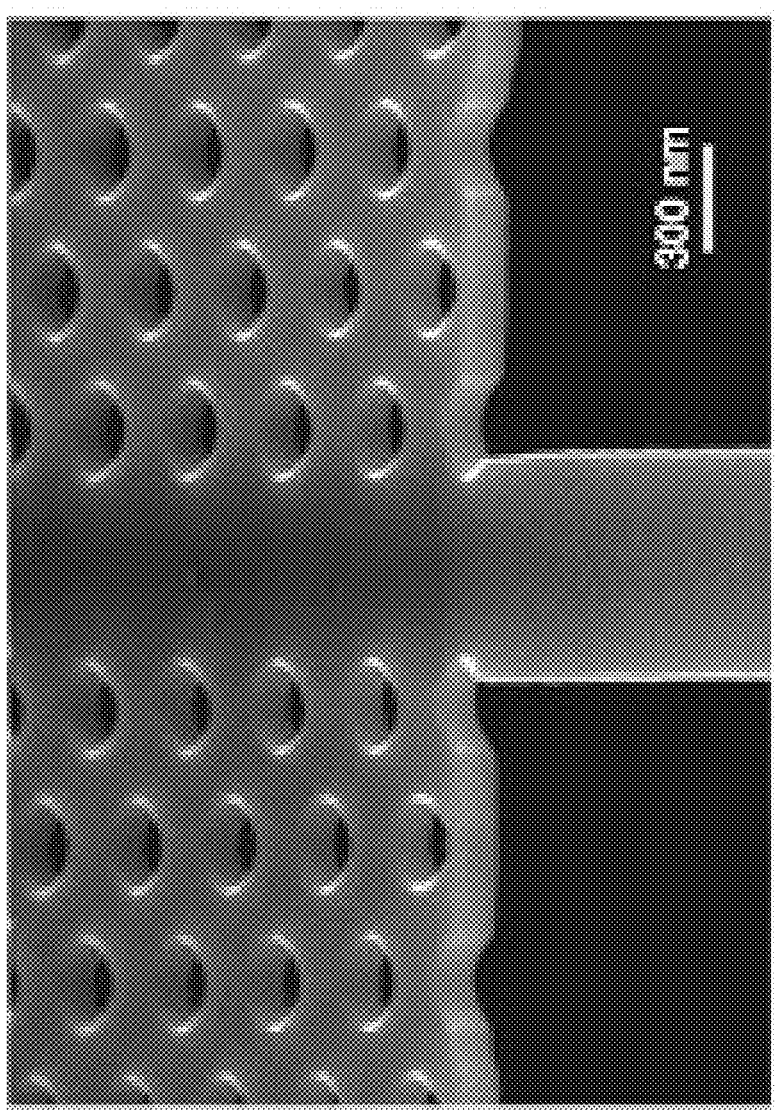
FIG. 1a illustrates formation of Mach-Zehnder interferometer (MZI) or modulators using silicon waveguides and modulators sections, in accordance with the prior art.

The limitations of the prior art identified above are overcome by employing cladded quantum dot based waveguides and cladding layers which can be tuned after fabrication. This feature also permits reconfiguration of demultiplexers, routers, channel drop filters and other devices needed in the realization of ultra-compact photonic integrated circuits.

In accordance with the present invention, an article and method is described where the method uses a cladded quantum dot array layer as a waveguide channel sandwiched between two cladding layers which includes index of refraction materials lower than the waveguide layer. This is advantageous because, unlike conventional waveguide layers, the overall effective index of refraction in a quantum dot array layer depends on: (1) dot and cladding material properties, and (2) the core diameter and cladding thickness. The cladded quantum dot layer hosts excitons in the presence of an optical wave signal having an appropriate wavelength, an enabling index of refraction and absorption tunability as a function of DC or RF (direct current or radio frequency) external electric field (applied via electrodes) via quantum confined Stark effect (QCSE). It should be appreciated that, unlike its conventional multiple quantum well (MQW) counterparts, $GeO_x$-cladded Ge quantum dots manifest much higher electro-absorption and index of refraction changes, resulting in more compact modulators, multiplexers, filters, and other devices. The operating wavelength, corresponding to the direct energy band gap, may be approximately about 1.3 to about 1.55 microns (although lower and/or higher wavelengths may be used).

In accordance with the present invention, the electro-optic properties of the cladded quantum dot (QD) array layer can be tailored by changing the cladding and/or core thickness and/or material composition of the quantum dots. Depending on the quantum dot core diameter and cladding thickness, a layer of such QDs can be treated as a quantum dot superlattice (QDSL) or multiple quantum dots. The QDSL advantageously results in narrow mini-energy bands which enable adjusting the properties (e.g. binding energy) of excitonic transitions, and controlling the electro-optic parameters of nanophotonic waveguide based devices. These cladded quantum dot layers are used to implement optical modulators in a variety of configurations including surface normal (electro-absorptive and electro-refractive in a Fabry-Perot Cavity) and waveguide optical modulators in Mach-Zehnder Interferometer configuration. Layers or regions which include a cladded quantum dot array, designed to having effective lower index of refraction, can also be used as transverse or lateral cladding regions around the waveguide. Additionally, they can be used as fillers of holes/columns in PBG structures in the lateral direction.

Moreover, cladded quantum dot layers may be used to implement photonic bandgap (PBG) crystal structures to form waveguides, optical modulators, optical filters, wavelength multiplexer and demultiplexers. One advantage of the invention includes a reduction in the size of various components and devices used in electronic circuits. Since cladded quantum dots are used in electronic devices, the invention provides a methodology to integrate Si electronics and photonic devices on Si and Si-on-insulator (SOI) substrates. Furthermore, the enhanced Stark effect also enables a reduction in the size of various devices.

For example, in one embodiment, the change of the index of refraction, enabled by applying the perpendicular electric field across the cladded quantum dot layer, can be used to design and fabricate reconfigurable photonic circuits by incorporating tunable multiplexers and demultiplexers. Since quantum dot gate or conventional electronic field-effect transistor (FET) devices can be located on the Si substrates, the invention can be used to design appropriate voltage sources and drivers at DC and RF frequencies. The current invention also facilitates the integration of nanoelectronics and nanophotonics. It should be appreciated that although examples using $GeO_x$—Ge and $SiO_x$—Si quantum dots have been provided, the invention may be used with other II-VI and III-V materials as cladded quantum dots.

It should be appreciated that photonic crystals are periodic structures composed of at least two materials having sufficient dielectric contrast. The length scale of a photonic crystal's periodicity (i.e., lattice constant) is approximately one-half the center band gap wavelength, which translates to under one micron for optical and near-infrared frequencies. This advantageously allows for the development of photonic crystal waveguides on a much smaller scale than possible with conventional dielectric waveguides, such as via optical fibers. Furthermore, if the dimensions of a photonic crystal are scaled by a certain factor but its dielectric ratio remains constant, the optical frequencies it supports will be scaled by that same factor. Moreover, based on the directions of their dielectric periodicity and thus of their PBG, photonic crystals may be classified as one-dimensional (1-D), two-dimensional (2-D), or three-dimensional (3-D). Two-Dimensional (2-D) photonic crystals, such as those embodied in the present invention, are typically comprised of low-index (usually air) holes in a dielectric substrate bordered on the top and bottom by cladding layers to form a waveguiding mechanism.

Figure 1B:
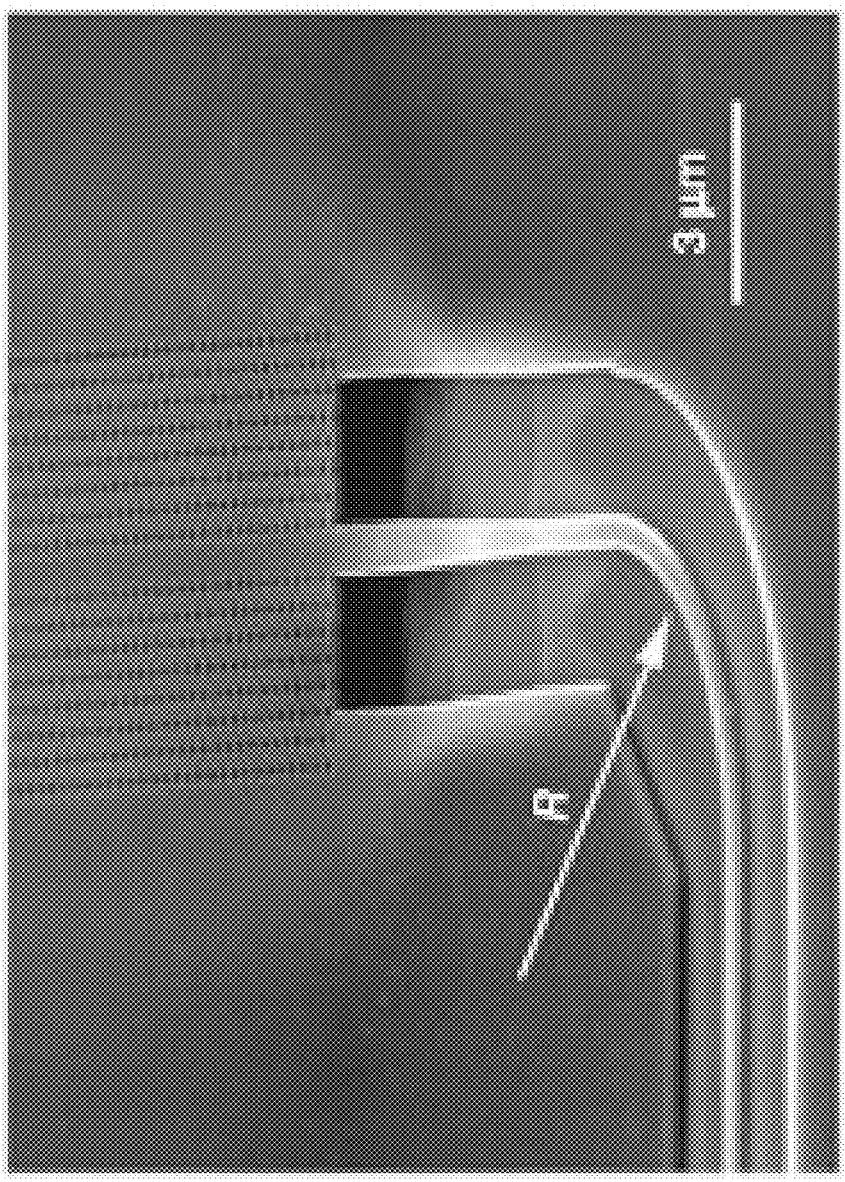
FIG. 1b illustrates formation of Mach-Zehnder interferometer (MZI) or modulators using silicon waveguides and modulators sections, in accordance with the prior art.
Figure 1C:
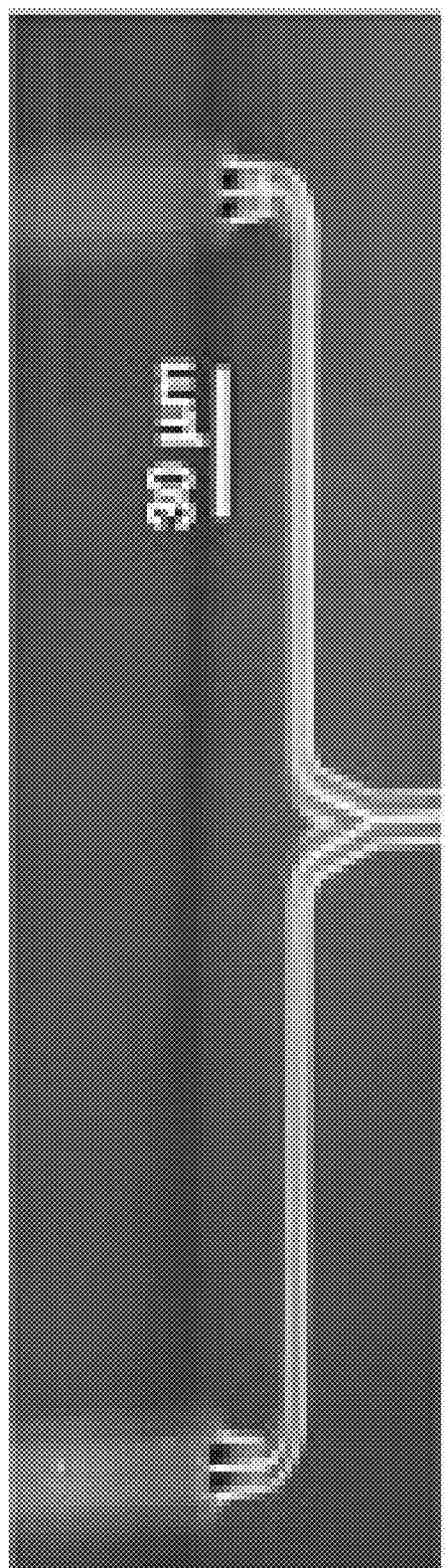
FIG. 1c illustrates formation of Mach-Zehnder interferometer (MZI) or modulators using silicon waveguides and modulators sections, in accordance with the prior art.

Referring to FIGS. 1a-1c, Scanning Electron Microscope (SEM) images of a passive unbalanced Mach-Zehnder interferometer using photonic crystal waveguides, in accordance with the prior art is shown, where FIG. 1a shows the input section of the photonic crystal waveguide showing the suspended silicon membrane etched with holes and butt-coupled to a strip waveguide. The termination of the photonic crystal lattice at the coupling interface is chosen to obtain highest coupling efficiency in the slow light regime. FIG. 1b shows a broader view of the photonic crystal waveguide membrane and input strip waveguide. As can be seen, after passing through a sharp 90° bend with radius R=5 μm, the mode is widened in the tapered section to better match the photonic crystal slow light mode. FIG. 1c shows the view of the input of the Mach-Zehnder interferometer (MZI) with the reference arm (left) and the signal (right) arm and a compact 15° angle Y-junction that splits the light equally between the left and right arms. The output side of the optical circuit (not shown) has an analogous Y-junction and is terminated by a single output strip waveguide.

Figure 2A:
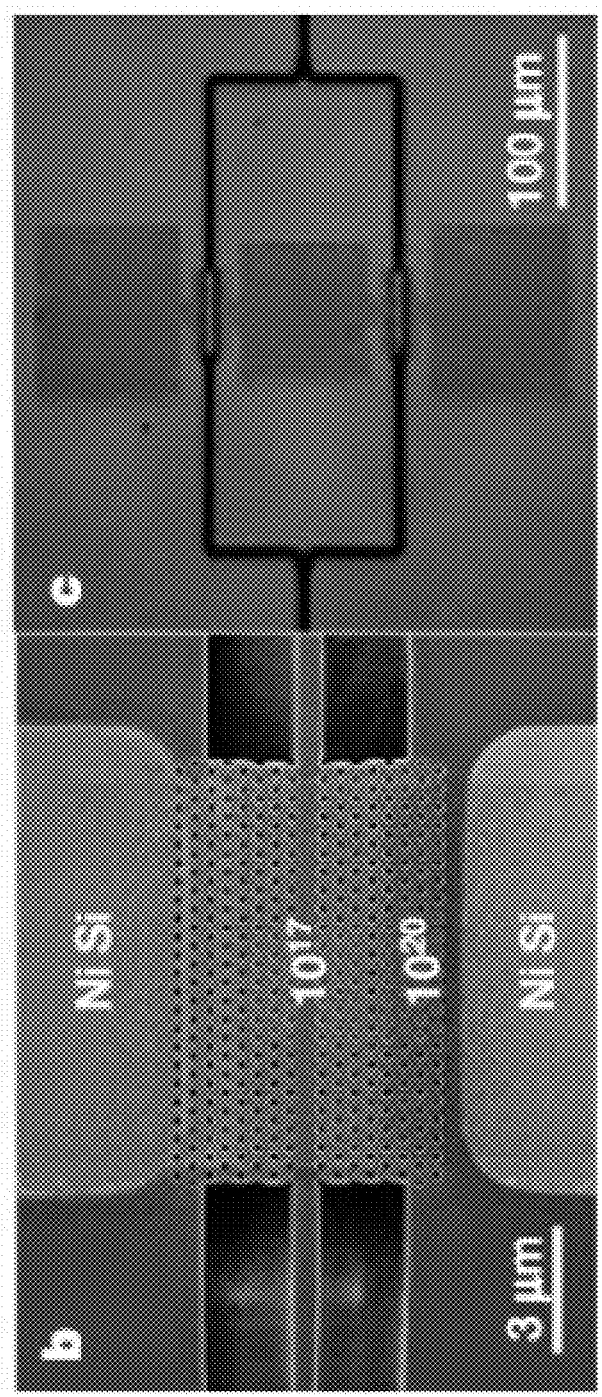
FIG. 2a illustrates an active electrically tunable MZI with lateral electrical contacts to photonic crystal waveguides where time averaged magnetic field energy density is calculated by the plane wave method in top-down view and plotted on a semi-logarithmic scale, in accordance with the prior art.
Figure 2B:
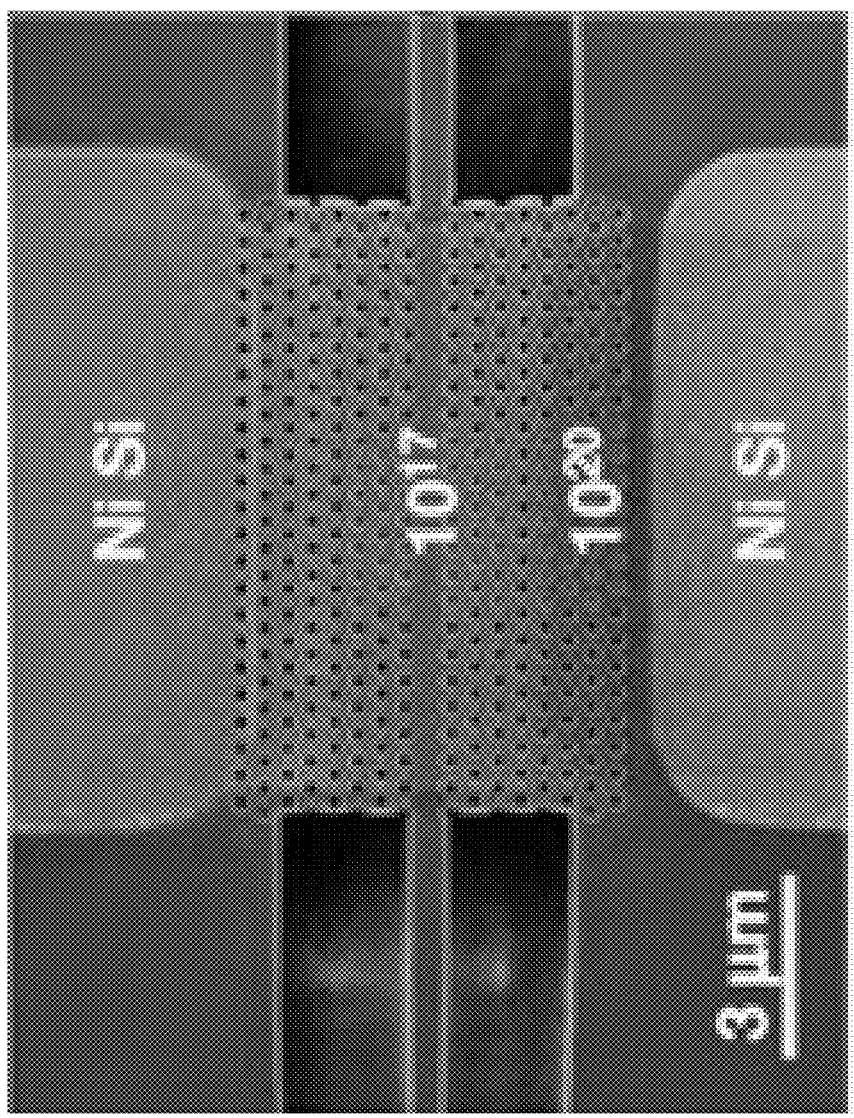
FIG. 2b is an SEM image of the fabricated photonic crystal waveguide of FIG. 2a with lateral electrical contacts superimposed with a false color representation to denote the different doping levels, in accordance with the prior art.
Figure 2C:
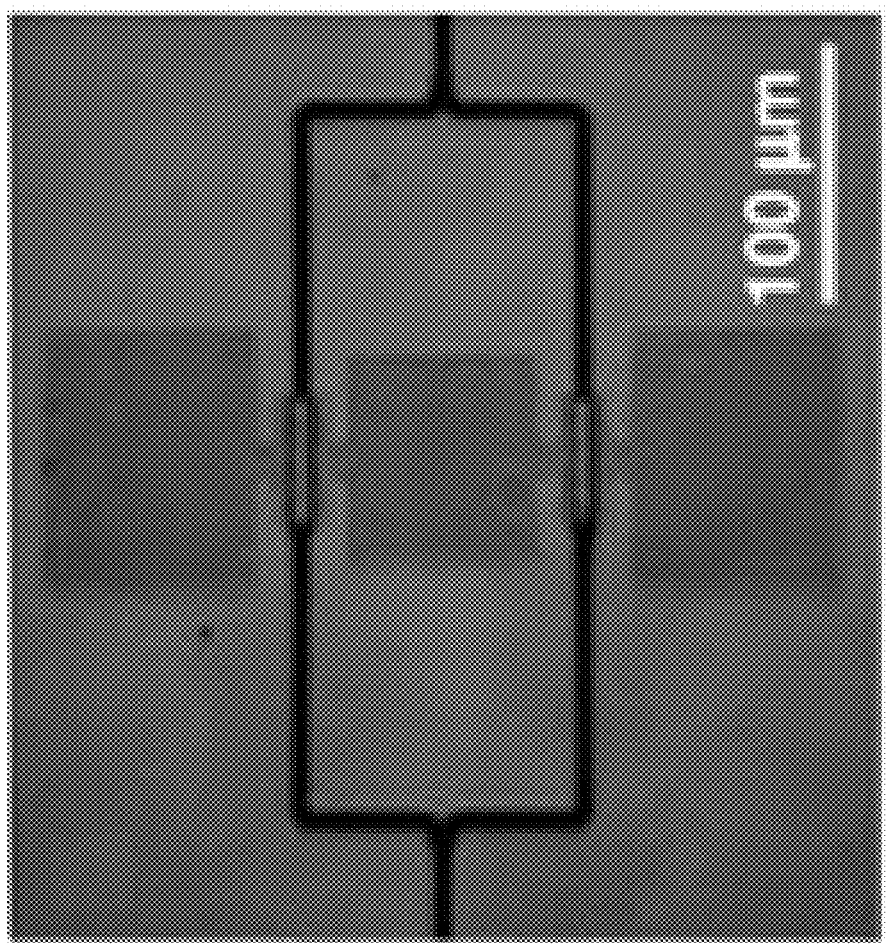
FIG. 2c is an optical micrograph of the completed MZI circuit of FIG. 2a with three electrical contacts, in accordance with the prior art.

Referring to FIG. 2a-2c, an active electrically tunable Mach-Zehnder interferometer (MZI) in accordance with the prior art is shown and includes lateral electrical contacts to photonic crystal waveguides, where FIG. 2a shows the time averaged magnetic field energy density calculated by the plane wave method in a top-down view (false color linear scale) and plotted on a semi-logarithmic scale (integrated over one unit cell). Referring to FIG. 2b, a SEM image of the fabricated photonic crystal waveguide is shown with lateral electrical contacts superimposed with a false color representation to denote the different doping levels. Referring to FIG. 2c, an optical micrograph of the completed MZI circuit is shown having three electrical contacts.

Figure 3A:
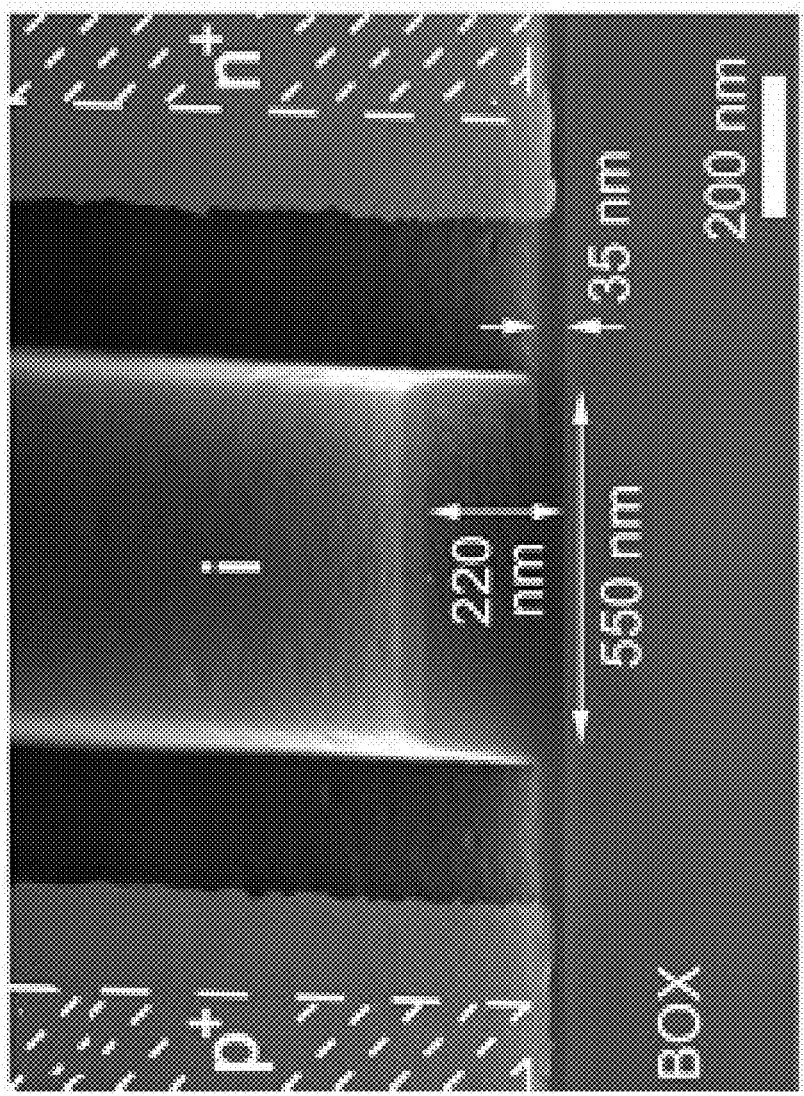
FIG. 3a is a cross-sectional SEM image showing an integrated waveguide and a p-i-n photodiode using a nano-photonic rib waveguide, in accordance with the prior art.
Figure 3B:
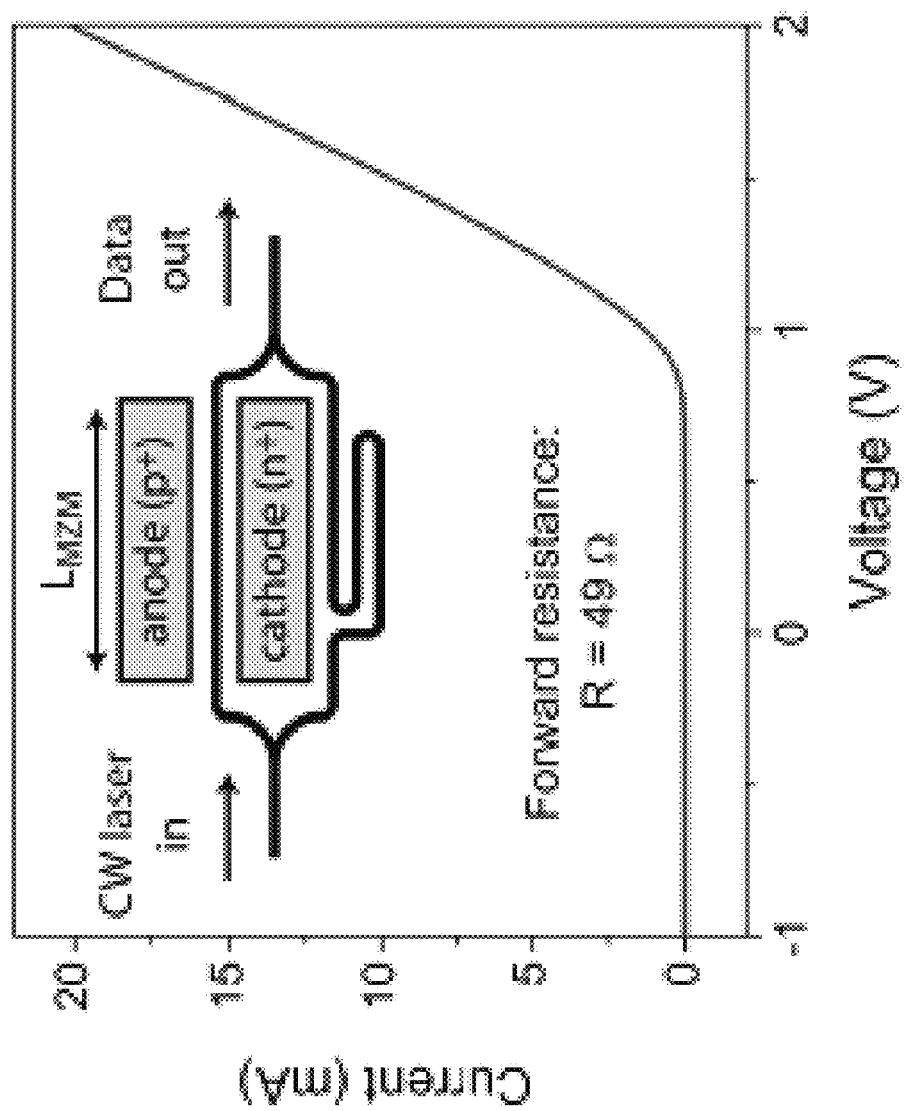
FIG. 3b is an electrical I-V trace taken for a modulator with $L_{MZM}$=100 µm (inset showing schematic of the asymmetric MZM device geometry fabricated), in accordance with the prior art.

Referring to FIG. 3a, a cross-sectional SEM image of an SOI p+-i-n+diode nanophotonic rib waveguide is shown in accordance with the prior art, where the heavily doped p+/n+ regions are hatched, and the nickel silicide contact regions are highlighted in gold false color. A 25 nm layer of silicon dioxide remains on top of the rib waveguide. Referring to FIG. 3b, a graph of the electrical I-V trace taken for a modulator with $L_{MZM}$=100 μm, illustrating a low forward resistance of 49Ω is shown, where the inset is a schematic of the asymmetric MZM device geometry fabricated.

Figure 4A:
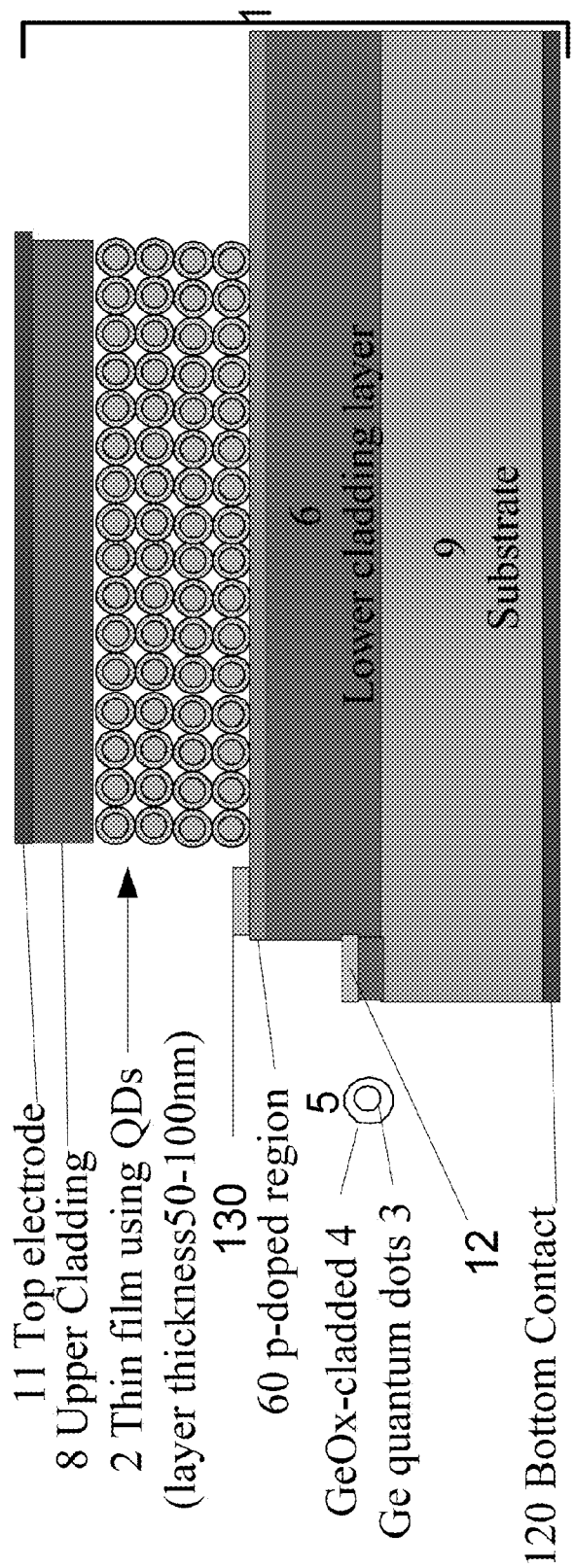
FIG. 4a is a cross-sectional view of a cladded quantum dot layer assembled on a cladded layer of a substrate, in accordance with an embodiment of the invention.

In accordance with the present invention, quantum dot based waveguides configured in conventional and Photonic Band Gap (PBG) configurations is provided, where the waveguides of the present invention can be used as modulators, filters, multiplexers and/or demultiplexers. Moreover, Voltage and/or electric field tunable structures are also provided. Referring to FIG. 4a, a cross-section schematic view of a quantum dot (QD) waveguide structure 1, is shown in accordance with an embodiment of the invention. It includes a quantum dot waveguide layer 2, an upper (or top) cladding 8, and a lower (or bottom) cladding 6. The lower cladding 6 can be realized on a substrate 9, where the lower cladding 6 may also have a thin layer 60 of a p-doped material. This p-doped material layer 60 helps to facilitate: (i) site-specific self-assembly of quantum dots, and (ii) application of an electric field across the QD layer 5 using the top electrode 11 and one of the bottom electrodes 130, 12 or 120, depending on the structure. The electric field DC and/or RF helps to achieve changes in the electro-optic properties (such as absorption coefficient, index of refraction, etc.) of this layer so that the device may be configured for various device applications, such as a modulator, a tunable filter, a tunable demultiplexer, etc. . . . . In one embodiment, the quantum dot waveguide layer 2 may be realized by deposition of a thin film (50-100 nm) comprising layers of Ge dots 3 (about 3-6 nm core diameter) with cladding of $GeO_x$ 4 layer (about 1-3 nm thick). The cladded Ge dots 5 are assembled on a lower index of refraction layer 6 or 60 (which may be selected from materials such as Si, ZnSe and/or ZnS). Moreover, it should be appreciated that the structure 1 can be configured as a three slab waveguide with conventional lateral confinement or as a photonic crystal waveguide using PBG structure for lateral confinement.

Figure 4B:
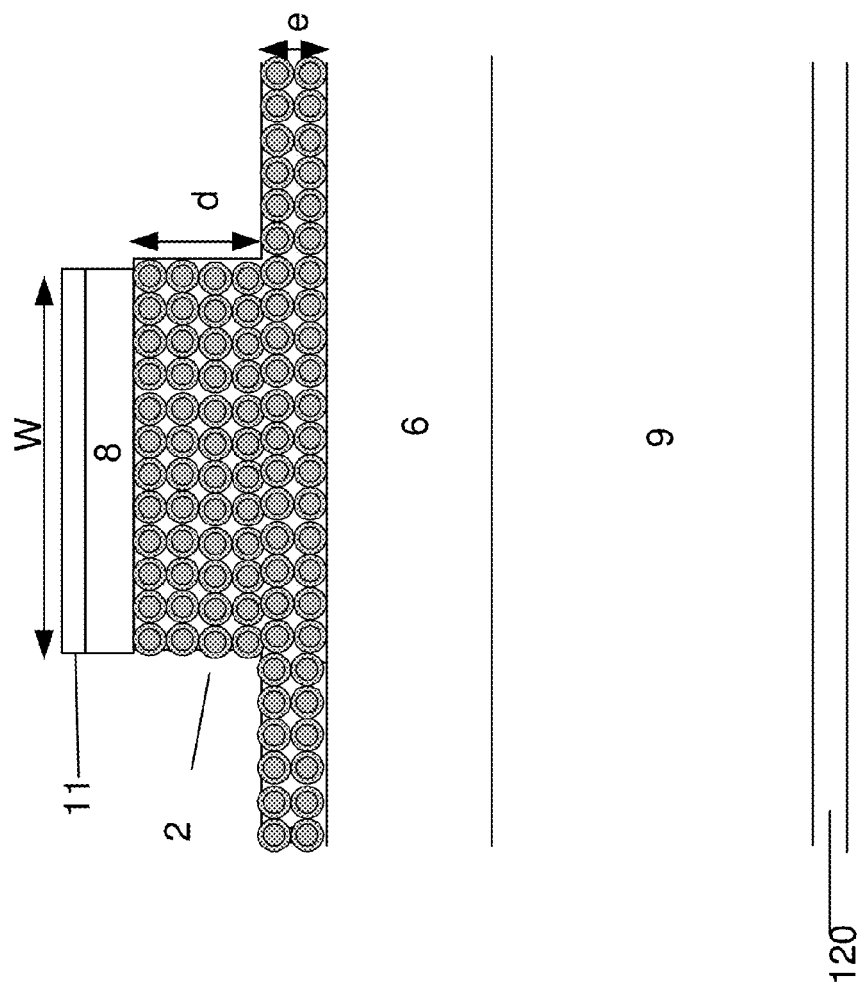
FIG. 4b is a view of a Quantum dot waveguiding layer configured as a ridge waveguide, in accordance with an embodiment of the invention.

Referring to FIG. 4b, a ridge waveguide having a quantum dot waveguiding layer is shown, where the ridge is comprised of part of the QD layer d and the upper cladding layer 8. The ridge includes a ridge width W which determines the lateral mode profile. Here the external voltage is applied using contacts 11 and 120 and the QD layer part e is also important in determining the mode profile in the ridge waveguide.

Figure 4C:
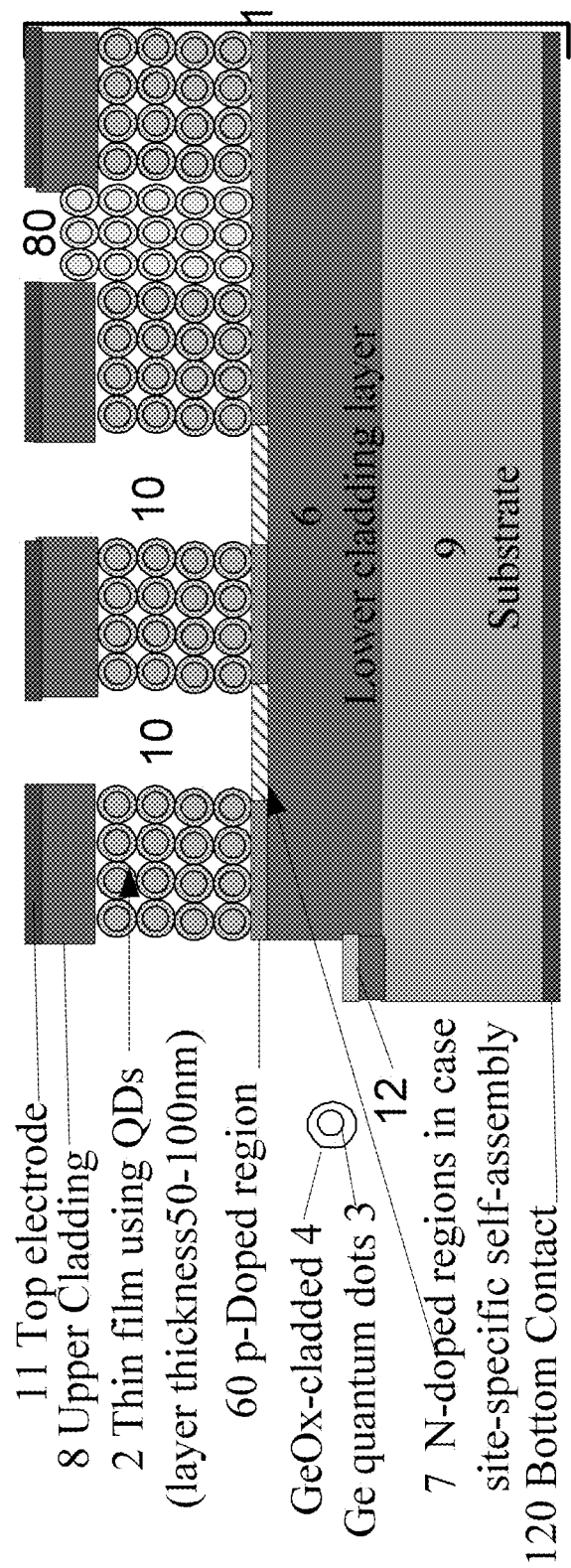
FIG. 4c is a cross-sectional view of a cladded quantum dot layer site-specifically assembled on a cladded layer of a substrate patterned in n- and p-doped regions, in accordance with an embodiment of the invention.

Referring to FIG. 4c, another embodiment is shown where the quantum dot layer is patterned according to the shape of the p-doped 60 and n-doped 7 regions. The separation 10 determines if the structure is a multiple waveguide or a photonic crystal type photonic band gap structure. The cladded Ge dots 5 site-specifically self-assemble on p-type doped regions 60 as opposed to n-type regions 7 that are realized on the surface of layer 6. Where the technique of site-specific self-assembly is not used, the n- and p-doped regions may not be needed. The cladded dot layer 2 is deposited with a top cladding layer 8. Additionally, when site-specific self-assembly is not used, conventional and PBG devices can be created by etching layers 8 and 2. The multi-layered structure is realized on a substrate 9, where the substrate may be selected from any suitable material or combination of materials, such as Si, silicon-on-insulator (SOI)/silicon-on-sapphire (SOS), Ge, and other semiconductors.

Figure 4D:
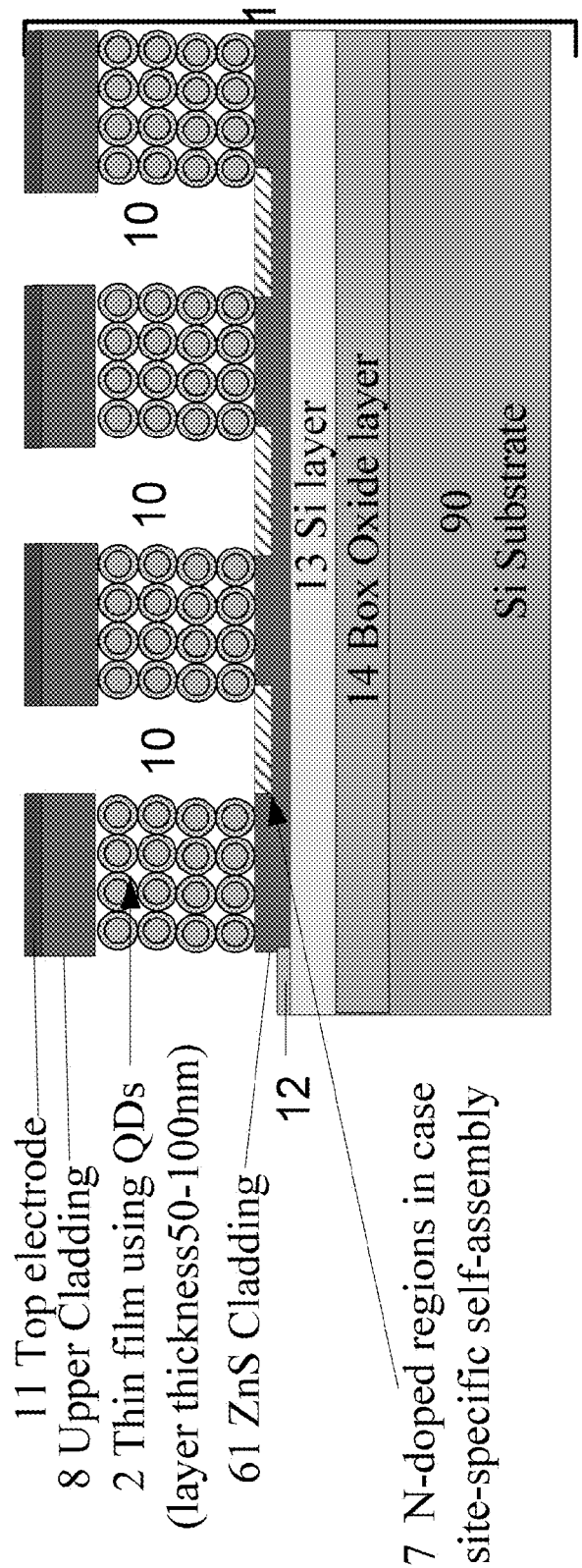
FIG. 4d is a cross-sectional view of a Si-on-insulator (SOI) substrate which implements cladded quantum dot waveguides and PBG structures, in accordance with an embodiment of the invention.

It should be appreciated that the details of SOI and SOS structures are described in FIG. 4d. As shown in FIG. 4c, the quantum dot layer 2, serves as a waveguiding layer due to its higher index of refraction with respect to the upper cladding layer 8 and the lower cladding layer(s) 6 or 60/6 and may be divided by regions 10 (which in turn may be selected from no medium or air or free space and/or lower index of refraction materials such as $SiO_2$, $SiON$, $Si_3N_4$) to create photonic crystal structures or conventional ridge or channel waveguides. The upper cladding 8 is deposited with a metal or highly doped semiconductor layer serving as the top electrode 11. The bottom electrode 120 is formed on the bottom side of the substrate 9. In another embodiment, the bottom electrode 12 is formed to layer 6 as shown. In the latter case, non-conducting substrates may be used. The top 11 and bottom electrodes 120 or 12 facilitate application of an external electric field and the electric field may cause changes in the index of refraction $\Delta n$, of the waveguide layer 2.

It should be appreciated that in one embodiment, the cladded quantum dots may be selected from at least one of $GeO_x$—Ge, $SiO_x$—Si, $Zn_yCd_{1-y}Se$—$Zn_xCd_{1-x}Se$ (y>x), and/or materials with similar properties. The operating wavelength is selected such that it is higher than the wavelength at which the absorption peak occurs in layer 2. In another embodiment, the QD waveguiding layer 2 can be realized with graded index by the manipulation of cladded quantum dots diameters and cladding thicknesses. Moreover, it is contemplated that a mix of $SiO_x$—Si and $GeO_x$—Ge dots can be used to tailor the effective index of refraction.

In still yet another embodiment, the spacing region 10 between two adjacent QD regions realized in layer 2, may be deposited with another set of cladded quantum dot layers 80 which has a lower index of refraction than waveguiding QD layer 2. For example, the waveguide layer 2 may be made of $GeO_x$—Ge QDs and regions 10 and/or 80 may be made of $SiO_x$—Si QDs. If QDs in layer 80 are self-assembled, then a region 60 under them should be included. This may require two steps in fabrication (shown in FIG. 7a, FIG. 7b and FIG. 7c).

Referring to FIG. 4d, a structure having a cladded $GeO_x$—Ge quantum dot layer assembled on Si SOI substrate 90 is shown having a combination of thin (10-100 nm) epitaxial Si layer 13 over box $SiO_2$ 14 which in turn is realized on a thick (100-400 microns) Si substrate 90 (which is called Si-on-Insulator (SOI)). The thin Si layer 13 may be deposited with one or more lower index of refraction layer(s) 61, such as for example ZnSe, ZnSe—ZnS, ZnS—ZnMgS and/or ZnSSe layers. If this layer 61 is also p-doped, then using site-specific self-assembly methodology, a QD layer 2 is deposited. As discussed above, this layer 2 deposits only on p-regions. Thereby, n regions 7 or etching can be used to form a desired waveguide device and/or a photonic band gap circuit topology. The upper cladding layer 8 and contacts 11 and 12 are similar to the structure of FIG. 4a.

It should be appreciated that in one embodiment, the Si epitaxial layer 13 may be p-type doped and so thin that it enables site-specific self assembly of QDs to form layer 2, while the box oxide layer 14 acts as the lower cladding layer to confine photons in the QD layer 2 which serves as the waveguide. In this case, layer 61 (constructed at least partially from II-VI materials) may not be needed.

Figure 4E:
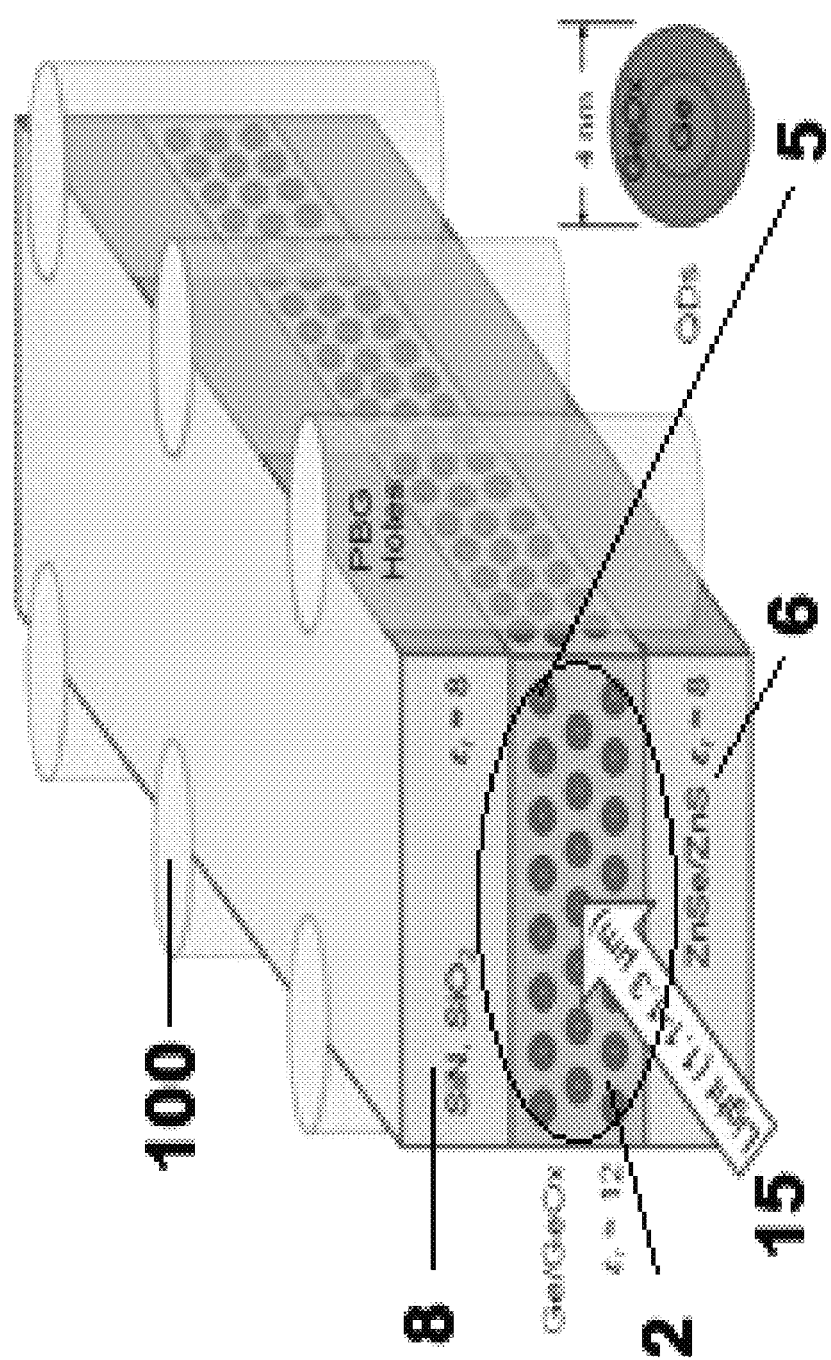
FIG. 4e is a three-dimensional schematic image of a photonic crystal (PC) device with a cladded quantum dot based waveguide layer in the transverse direction sandwiched between top and bottom cladding layers where a waveguide is formed by removing a column of holes from the PC matrix, in accordance with an embodiment of the invention.

Referring to FIG. 4e, a three-dimensional schematic of a PBG based device is shown and illustrates the formation of a waveguide region by removing a column of PBG holes 100 from the matrix. The etching of layer 2 to achieve regions 10 could result in ridge waveguides and/or photonic band gap (PBG) and/or photonic crystals. The waveguide layer 2 comprising a QD 5 array layer is sandwiched between the upper cladding layer 8 and the lower cladding layer 6. The regions shown as 10 in FIGS. 4a-4d may now be configured as holes 100 thereby forming a photonic crystal waveguide. The three-dimensional schematic shows the holes 100 (also known as columns) going through the upper 8 and the lower 6 cladding layers and is dependent on the PBG design. Unlike a 3-D PBG based device, in 2-D PBG, one may stop at the interface of layer 2 and 6. Thus, the incident light beam 15 is coupled to the PBG waveguide in layer 2 and propagates to the other end of the guide.

Figure 4G:
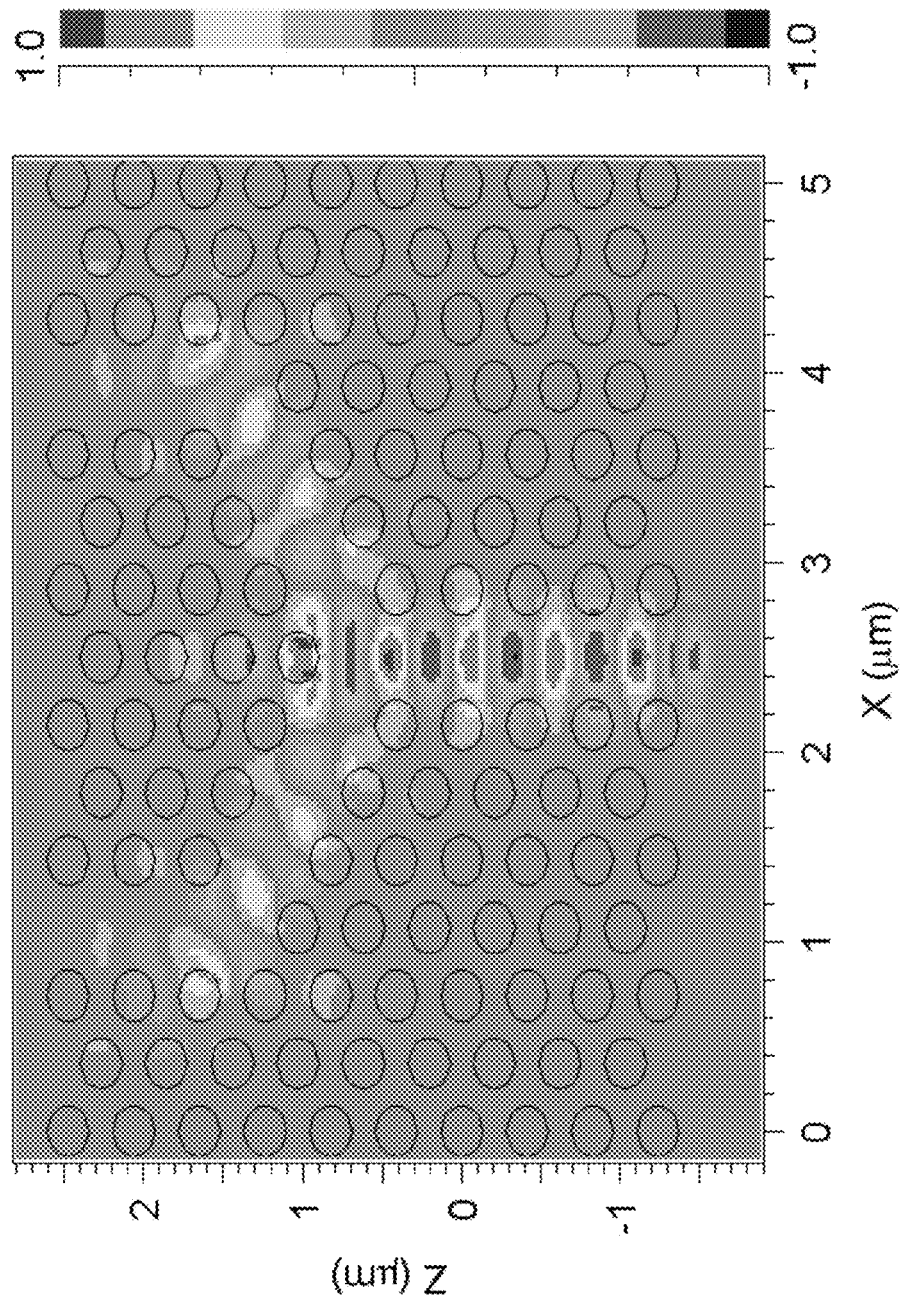
FIG. 4g is a three-dimensional image illustrating a finite-difference time-domain simulation of a PBG waveguide composed of top and bottom cladding layers and a middle quantum dot layer illustrated in FIGS. 4a-4c.

FIG. 4f illustrates the topology of a Mach-Zehnder modulator, where the incident light beam 15 is coupled in the waveguide layer 2 (see FIG. 4e), formed by cladded quantum dots 5 and is divided into two arms 17 and 18 at Y-junction 16. One of the waveguide sections (between 17 and 20) modulates the index of refraction by applying DC and/or RF voltage signal V 19. The perpendicular component of the electric field E (due to the applied voltage) primarily changes the index of refraction of the cladded quantum dot layer via the quantum confined Stark effect. This results in a phase shift between two light beams 20 and 21. When these two light beams 20 and 21 are combined at the Y-junction 22, the output light signal beam 23 is modulated depending on the phase shift. There is no signal if the phase shift is $\pi$. We are assuming that the incident light signal 15 is coherent. FIG. 4g shows the simulation of a typical PBG waveguide structure with light beam splitting into two waveguides at the Y-junction.

It should be appreciated that optical multiplexers, often in the form of arrayed waveguide gratings (AWGs) that combine multiple laser signals of different wavelengths for transmission over optical fibers, are widely used in the telecommunications industry. Likewise, wavelength-division demultiplexers (WDDM) are commonly employed to separate individual signals, each carrying a stream of data. Photonic crystal based multiplexers and demultiplexers can have a much smaller size scale than that of conventional devices, thereby providing efficient operation and compact optical components. Photonic crystal based demultiplexers have previously been designed that feature asymmetric-defect coupled-cavity waveguides (AD-CCWs) to separate up to six signals of particular wavelengths from a broadband input.

Figure 5A:
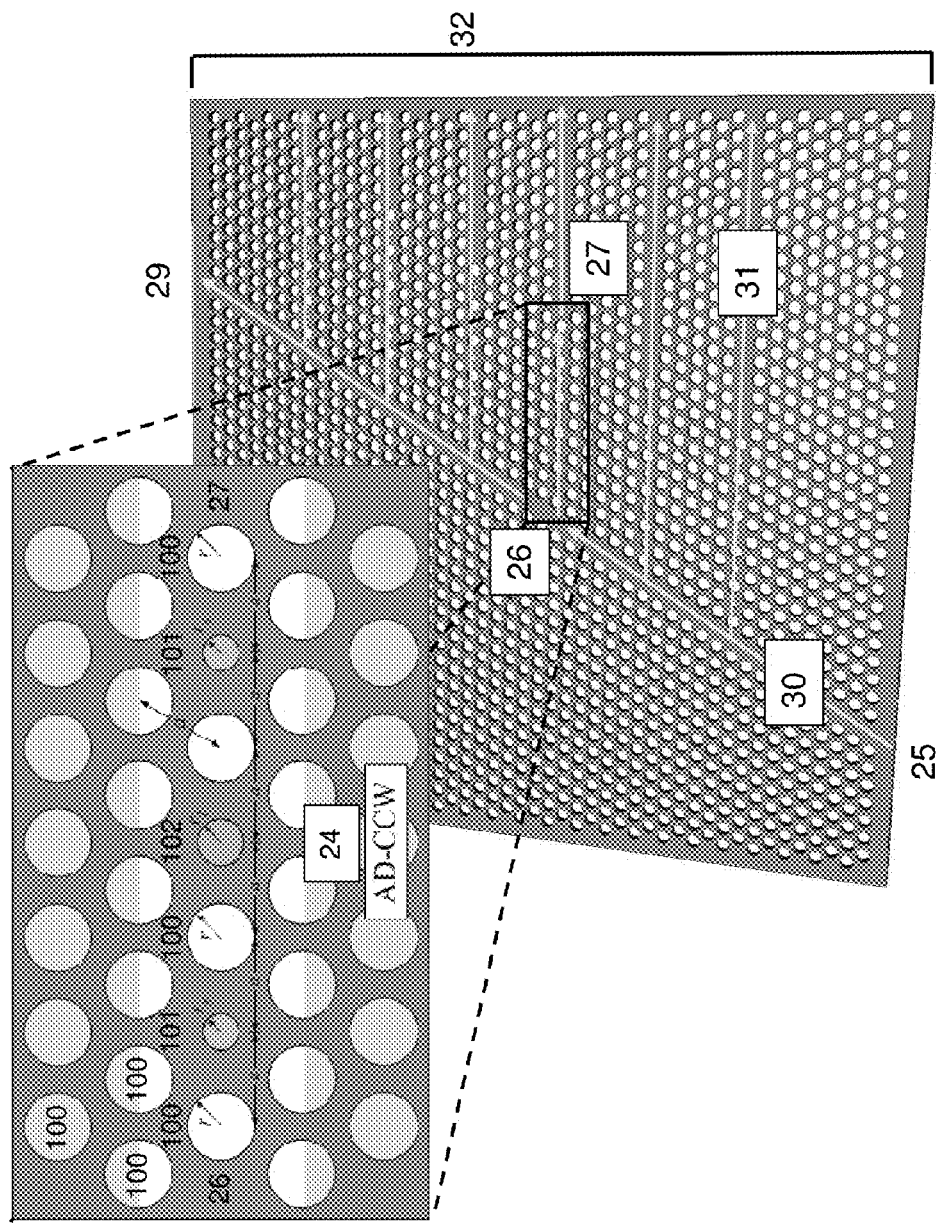
FIG. 5a is a graphical image showing a top view of a six-channel demultiplexer that uses an Alternate-Defect Coupled-Cavity Waveguide (AC-CCW) (shown in exploded view in inset), in accordance with an embodiment of the invention.

FIG. 5a depicts the top view of a six-channel demultiplexer 32 comprising a triangular lattice photonic crystal structure in an Alternate-Defect Coupled-Cavity Waveguide (AD-CCWs) 24 configuration, in accordance with an embodiment of the invention. As shown in the inset of FIG. 5a, an AD-CCW may be created from a row of holes 100, where the diameter of every other hole along the row is selectively reduced by a greater or lesser extent to form smaller diameter defect holes 101 and larger diameter defect holes 102. Relatively broadband light 25 with multiple wavelengths enters waveguide 30 (shown as a slanted line-defect waveguide where a line comprised of holes/columns is missing). As light 25 traveling up this waveguide 30 comes into the vicinity 26 of an AD-CCW configuration 24, photons with wavelength λ3 supported by the first defect cavity, couple into it. The remaining photons are unaffected by this coupling process and continue down the line-defect waveguide, some of which will eventually exit 29 the demultiplexer device 32. The photons resonating in the first AD-CCW defect cavity will couple into adjoining cavities and continue to propagate through the AD-CCW structure (or configuration), and will eventually traverse the length of the waveguide 27 and exit at 28. Waveguide 31 shows another channel which filters wavelength λ1 using appropriate AD-CCW cavity configuration (which may be different from 24). It should be appreciated that this demultiplexer device has six channels of which two are shown explicitly.

Figure 5B:
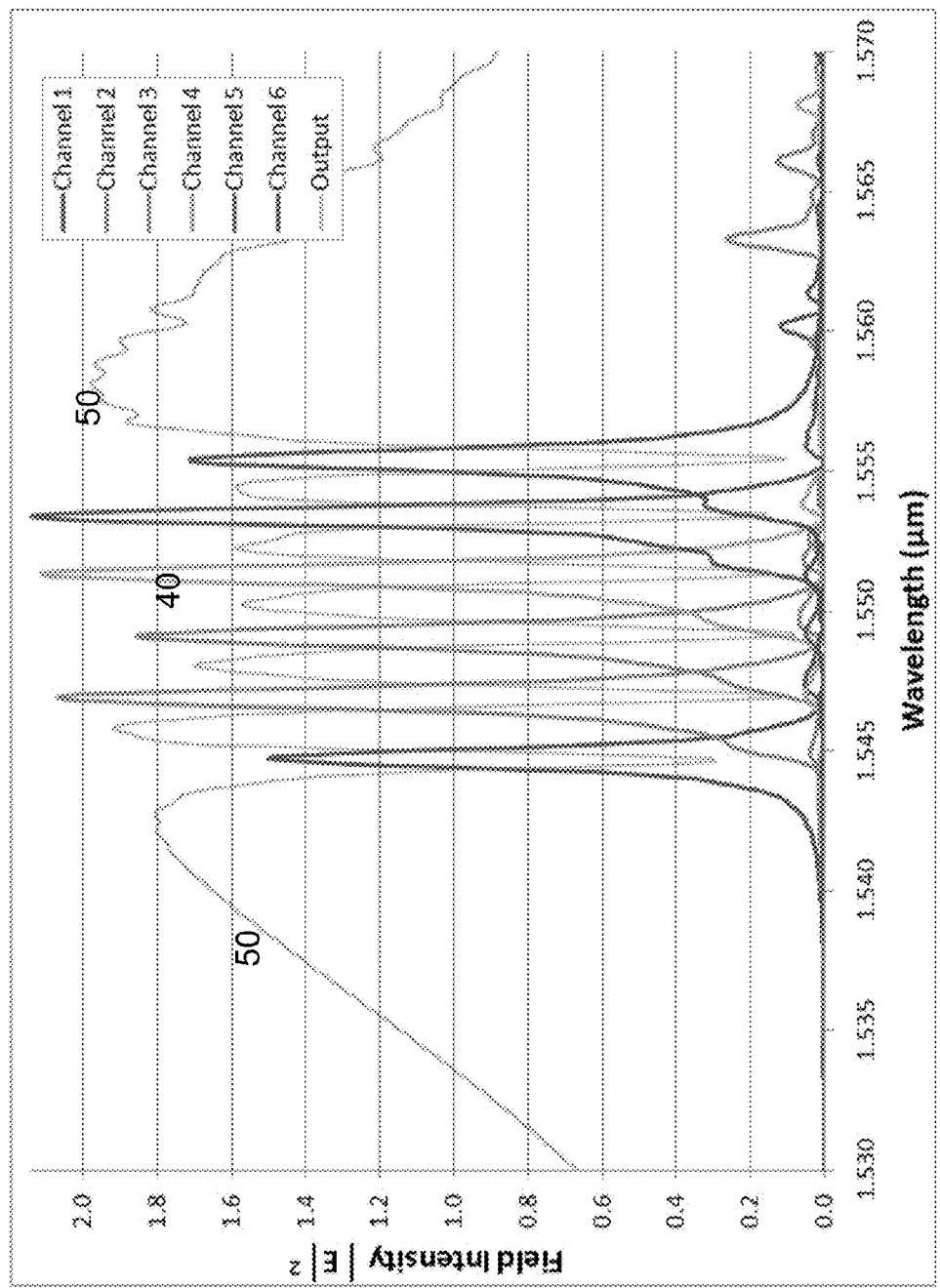
FIG. 5b is a graph showing the transmission spectra of a 6-channel demultiplexer, in accordance with an embodiment of the invention.

Moreover, the operating wavelengths of this type of demultiplexer can be tuned by adjusting the effective index of the holes in AD-CCW structure 24 if the holes are filled with appropriate varying refracting index cladded quantum dot array layers/regions. The effective hole size thus can be manipulated by external applied voltages. Referring to FIG. 5b, the transmission spectra of a 6-channel demultiplexer is shown, where the outputs of the demultiplexer 32 are comprised of six peaks 40. These peaks λ1-λ6 exhibit narrow linewidths (~2 nm) at specific central wavelength. The output signal exiting from the primary slanted line-defect waveguide 29 is broadband without the λ1-λ6. It should be appreciated that in these devices, the AD-CCWs, which branch out from the main broadband line-defect waveguide in the photonic crystal structure, feature alternating holes of reduced diameters, which resonate at a specific wavelength based on the relative dimensions of the holes. The photons which resonate within the AD-CCWs are effectively separated from the broadband input and guided to output line defect waveguides.

It should be appreciated that in an embodiment of the invention, a novel reconfigurable wavelength demultiplexer using tunable structures is provided, where use of cladded quantum dot layers, whose index of refraction can be changed locally by applying a perpendicular electric field, provide a novel design flexibility permitting tuning of wavelengths. By changing the index of refraction of the surrounding medium, the effective index ratio of an alternate defect coupled cavity waveguide (AD-CCW) can be changed, thereby transforming the AD-CCW into a tunable waveguide. This can be used to reconfigure a demultiplexer output by individually tuning to particular wavelengths.

Figure 6A:
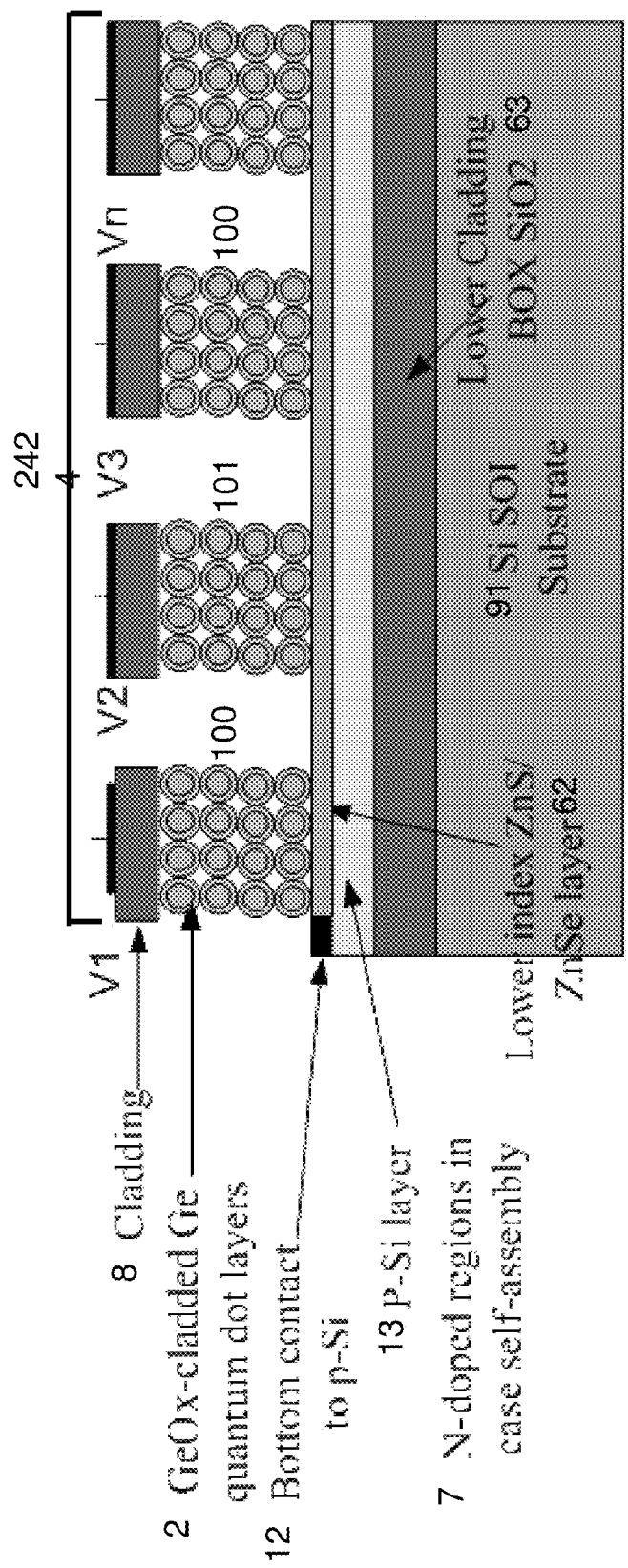
FIG. 6a is a cross-sectional schematic of one channel of an Alternate Defect Coupled Cavity Waveguide (AD-CCW) implemented in an SOI wafer, in accordance with an embodiment of the invention.
Figure 6B:
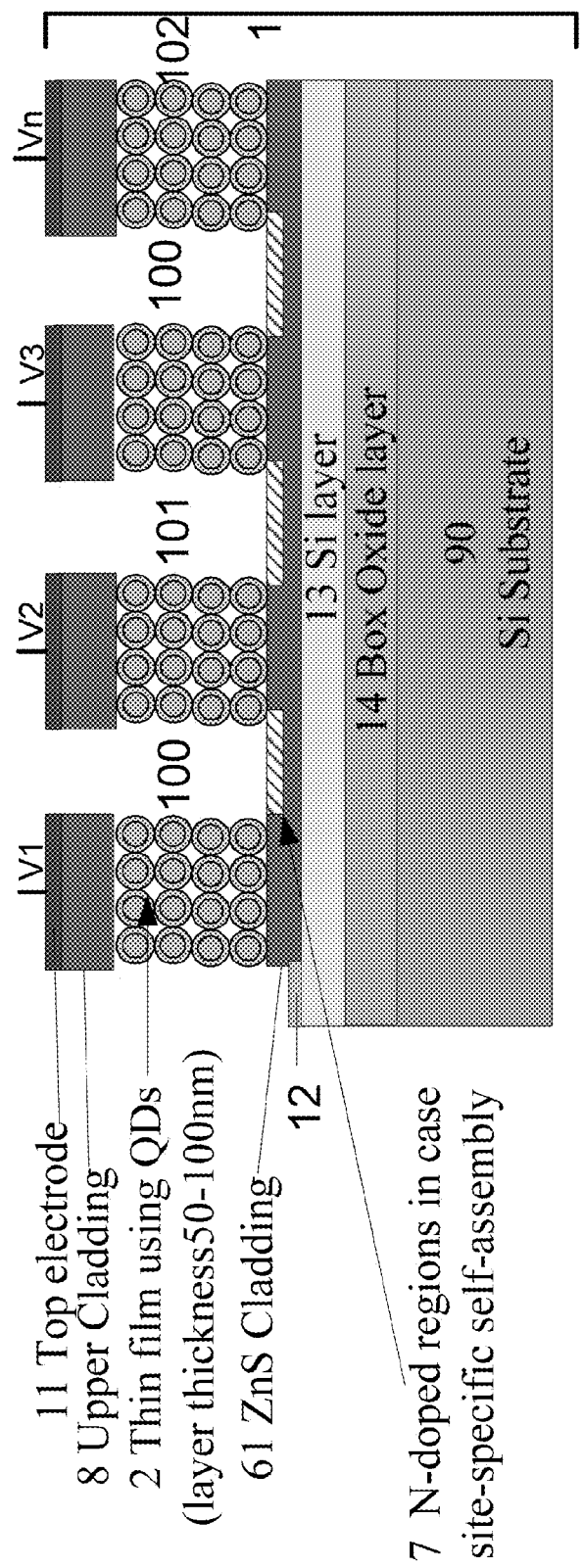
FIG. 6b is a cross-sectional schematic of one channel of an AD-CCW implemented in an SOI wafer using site-specific self-assembly on p-doped regions, in accordance with an embodiment of the invention.

Referring to FIG. 6a, a cross-sectional schematic diagram illustrating a single channel of an alternate defect coupled cavity waveguide, AD-CCW 24, implemented in SOI wafer is shown, in accordance with an embodiment of the invention. The holes shown as 100, 101 essentially form the cavities in the AD-CCW through which the light propagates and travels through the length of the waveguide 27. Note that the hole sizes are different as shown 100, 101, 100, 102 etc. Additionally, FIG. 6a also shows schematically how an external voltage could be applied to a specific region of dots (in waveguide and lateral cladding layers/regions) and would change the effective index of refraction of region surrounding the smaller or larger holes (forming the AD-CCW waveguide). Referring to FIG. 6b, a cross-sectional schematic diagram illustrating one channel of an AD-CCW structure 1001 implemented in SOI using site-specific self-assembly on p-doped regions is shown, in accordance with an embodiment of the invention. Here, the quantum dots may be assembled on a patterned layer 61 having lower index of refraction than the quantum dot waveguide layer 2 comprising of n-regions 71 (or 7) and p-regions in layer 61.

Figure 6C:
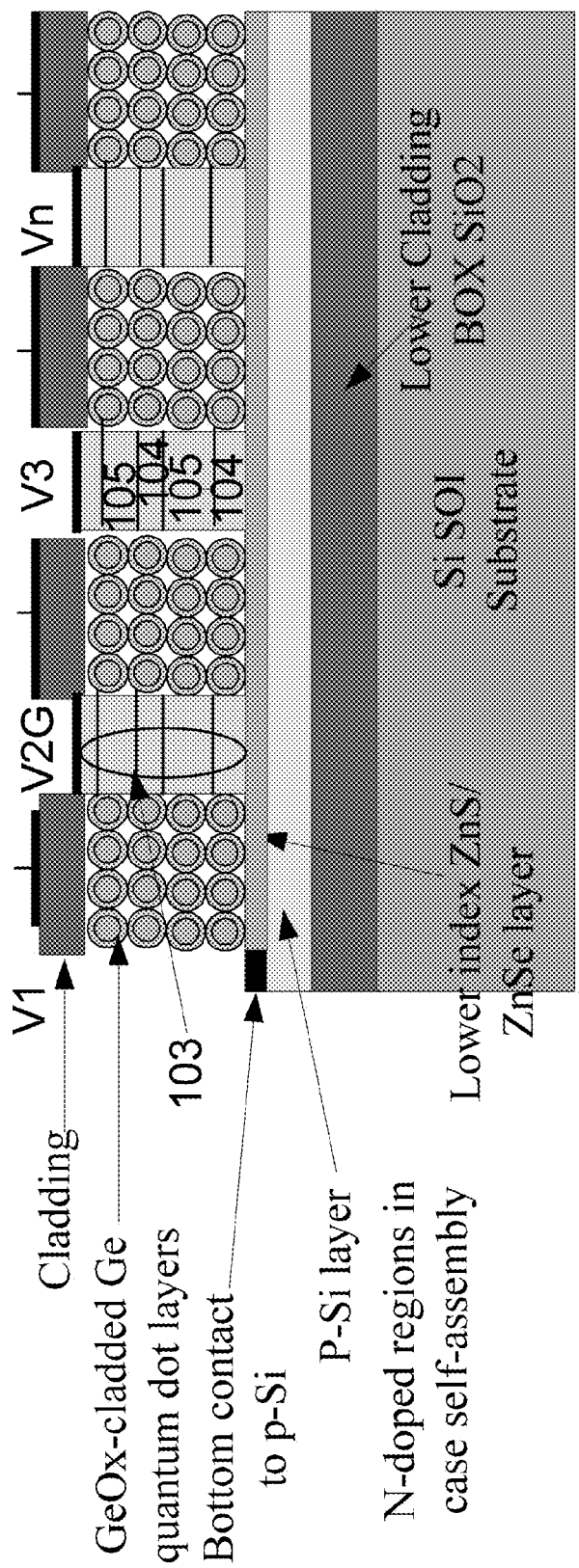
FIG. 6c is a cross-sectional schematic of one channel of an AD-CCW with tunable low index holes/columns comprised of multiple quantum well (MQW) layers with an appropriate lower index of refraction with respect to the waveguiding layers, in accordance with an embodiment of the invention.

Referring to FIG. 6c, a schematic diagram illustrating one channel of an AD-CCW with tunable low index holes/columns comprised of multiple quantum wells (MQWs) layer 103 with appropriate effective lower index of refraction with respect to the waveguiding layers is shown, in accordance with an embodiment of the invention. The multiple quantum wells comprised of periods of wells 104 and barriers 105 to yield a MQW layer 103.

Figure 7A:
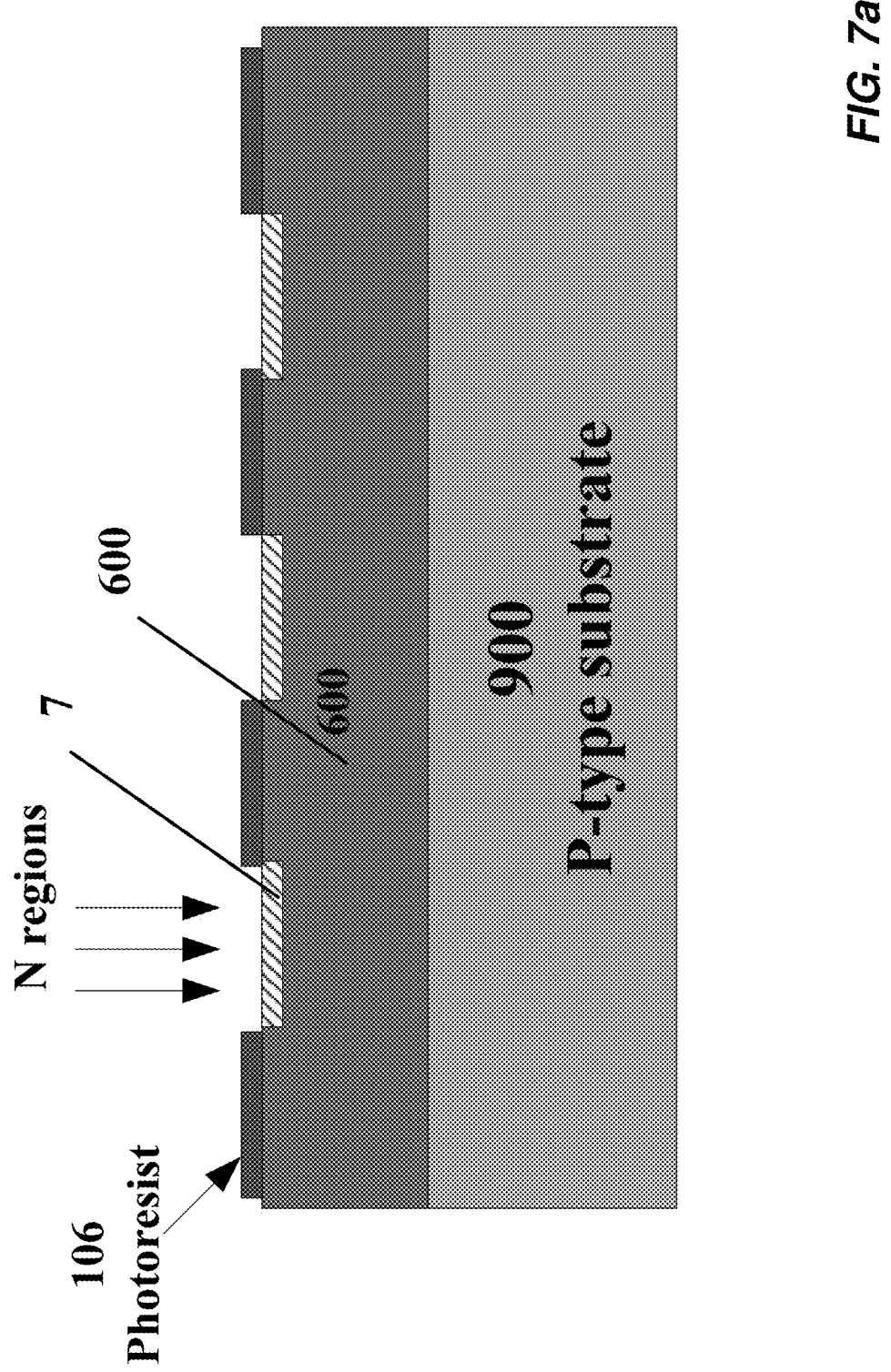
FIG. 7a is a cross-sectional schematic of the resultant patterned structure following n-type implantation with n-doping, in accordance with an embodiment of the invention.
Figure 7B:
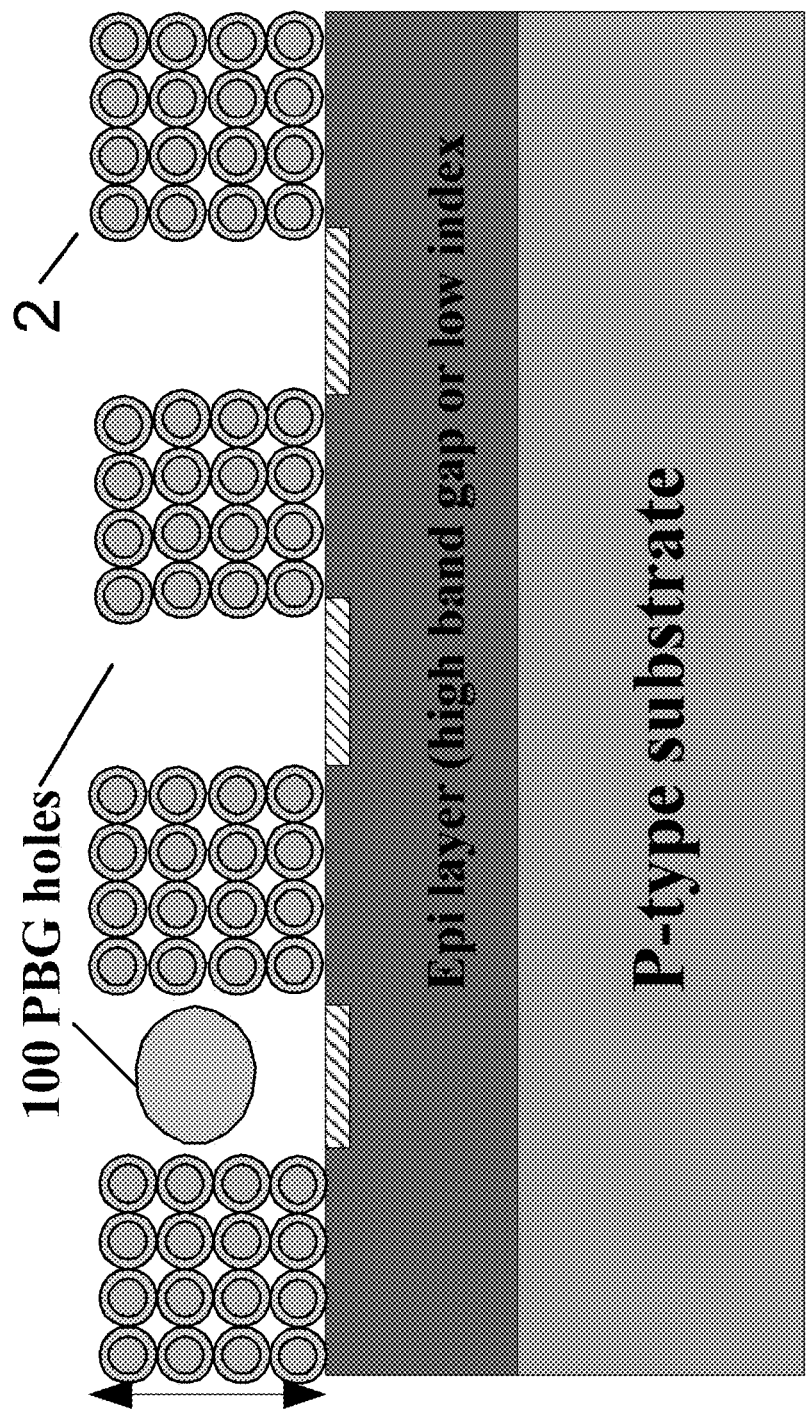
FIG. 7b is a cross-sectional schematic showing self-assembly of nanodots on p-doped regions (the regions outside the nanodots represent PBG holes), in accordance with an embodiment of the invention.
Figure 7C:
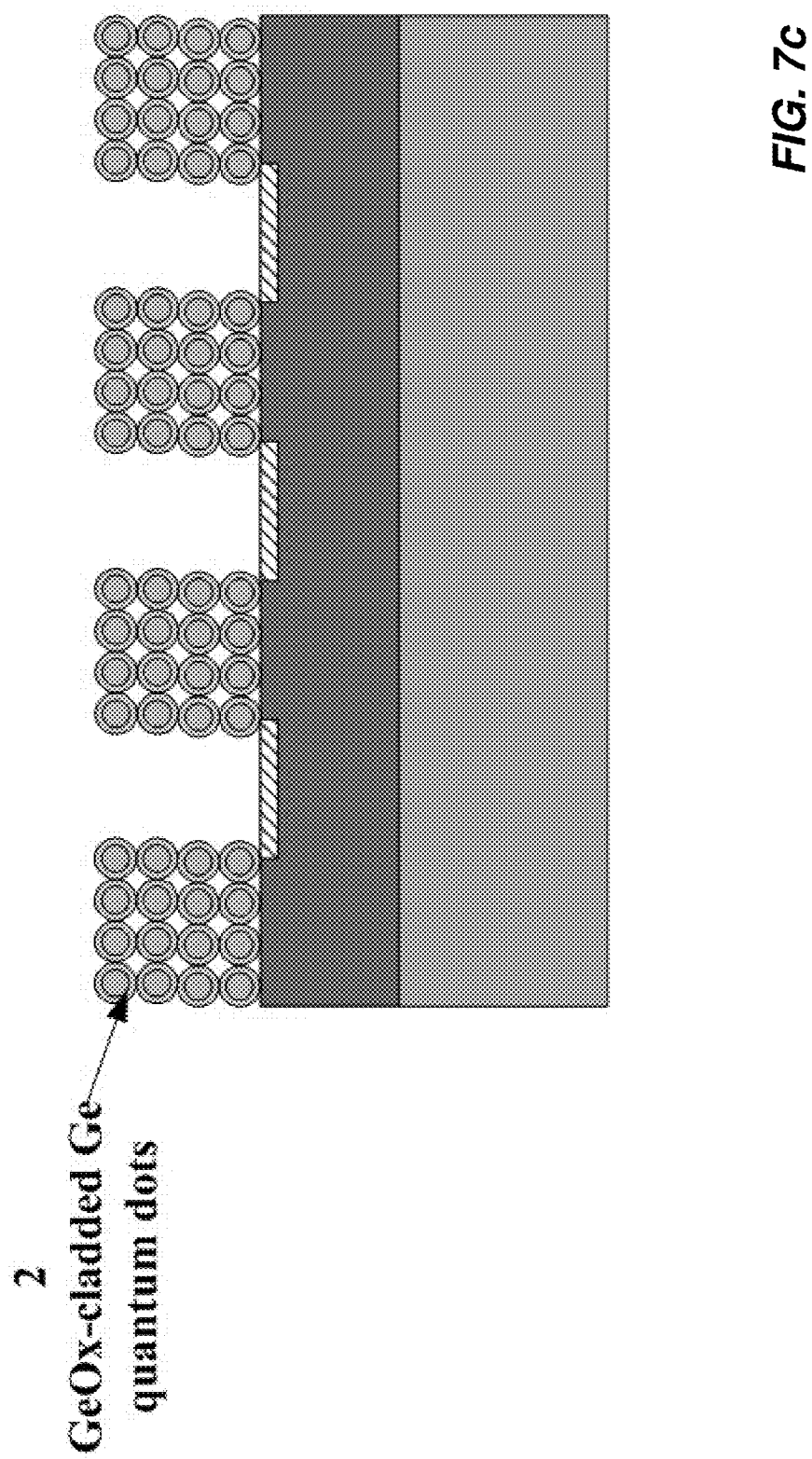
FIG. 7c is a cross-sectional schematic showing self-assembled nanodots forming a PBG structure, in accordance with an embodiment of the invention.

Below one or more methods of fabricating cladded quantum dot based waveguides and Photonic Crystal (PC) and PBG devices and circuits are discussed. Referring to FIG. 7a, FIG. 7b and FIG. 7c, one embodiment of a method for implementing cladded quantum dot layers and patterning them to fabricate desired photonic devices and circuits is shown and includes, starting with a p-type substrate 900 and depositing a p-epi layer 600 with lower index of refractive material(s) (such as ZnSeTe, ZnS, ZnSe, etc.). If the layer 600 is not p-doped, deposit a p-doped region 60 (like that shown in FIG. 4c). Pattern using electron-beam or deep-UV or extreme UV (EUV) or other lithography techniques the resist layer 106. Perform n-type implantation to create regions 7 with n-doping. Additionally, n-regions can be created by re-growth using SiO2 or other suitable masking layer in place of resist 106. This is shown in FIG. 7a. Remove resist (PR) layer 106 and anneal it to remove implant damages. Site-specifically self-assemble on p-type regions cladded dots including $GeO_x$-cladded Ge or $SiO_x$-cladded Si dots or mixed Si and Ge dots.

Referring to FIG. 7b, self-assembly of quantum dot layer 2 on p-doped regions 600 in turn realized on a substrate 900 (the substrate also represent SOI). The regions outside the nanodots represent PBG holes. Here the epilayer which is p-doped is shown as 600 with n-regions 7 patterned to create PBG/Photonic crystal gaps 100. Referring to FIG. 7c, self-assembled quantum dot layer 2 to form photonic crystal structure (with holes 100s) forming the PBG structure or lateral cladding region (See FIG. 9a) is shown. At this point, the lateral regions (10 or 100s) between quantum dot based waveguide layer 2 are filled with plasma-enhanced chemical vapor deposition (PECVD) grown $SiO_2$ layer. This forms the upper cladding layer 6 as well as provide lower index of refraction material for holes 10 and 100s having the desired index difference between the $SiO_2$ cladding (index of ~1.46) and $GeO_x$-cladded Ge waveguiding layer (which has an effective index of refraction of around 3.5 depending on the dot cladding thickness). Pattern the photonic crystal (to form PBG structure) formed by the self-assembled nanodots and low index $SiO_2$ layer to create two parallel waveguides formed by rows of missing 'holes' (regions outside the nanodots). Adjoin conventional bifurcating Si based optical waveguides to each end of the PBG waveguides. Variations in the physical, thermal, and/or electrical properties of the two PBG waveguides can be instituted (e.g., incorporating electrical contacts to selectively heat the PBG structure) to allow active control of the optical modes, forming a type of Mach-Zehnder interferometer. It should be appreciated that one embodiment a composite of Si waveguide with a quantum dot waveguide is envisioned.

Figure 8:
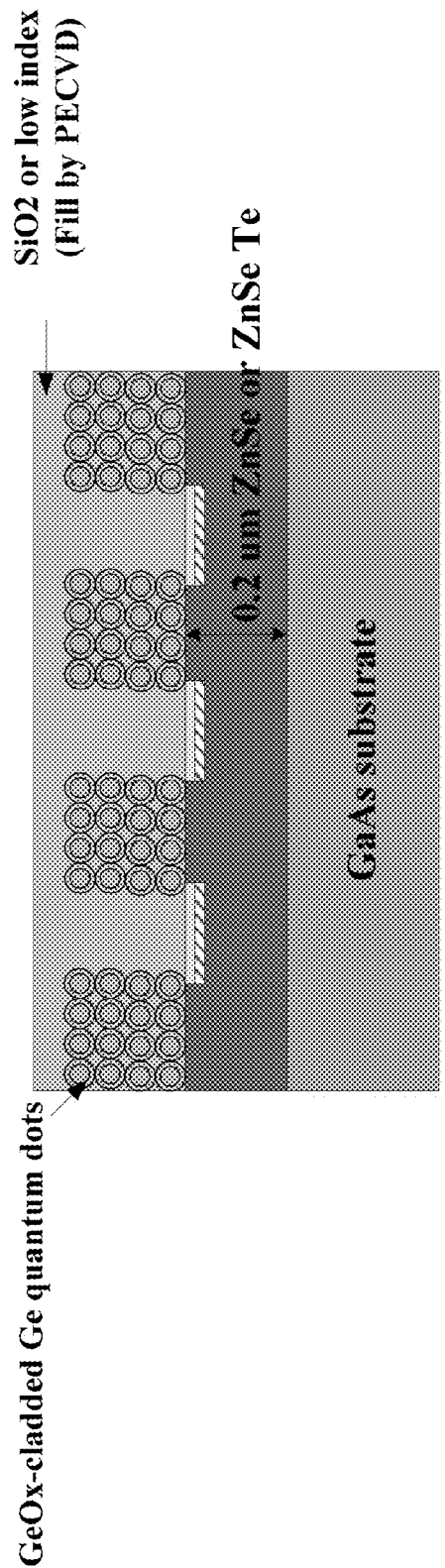
FIG. 8 is a cross-sectional schematic showing a PBG structure formed by self-assembled quantum dots layers with gaps filled by layer of $SiO_2$ grown by PECVD, in accordance with an embodiment of the invention.
Figure 9A:
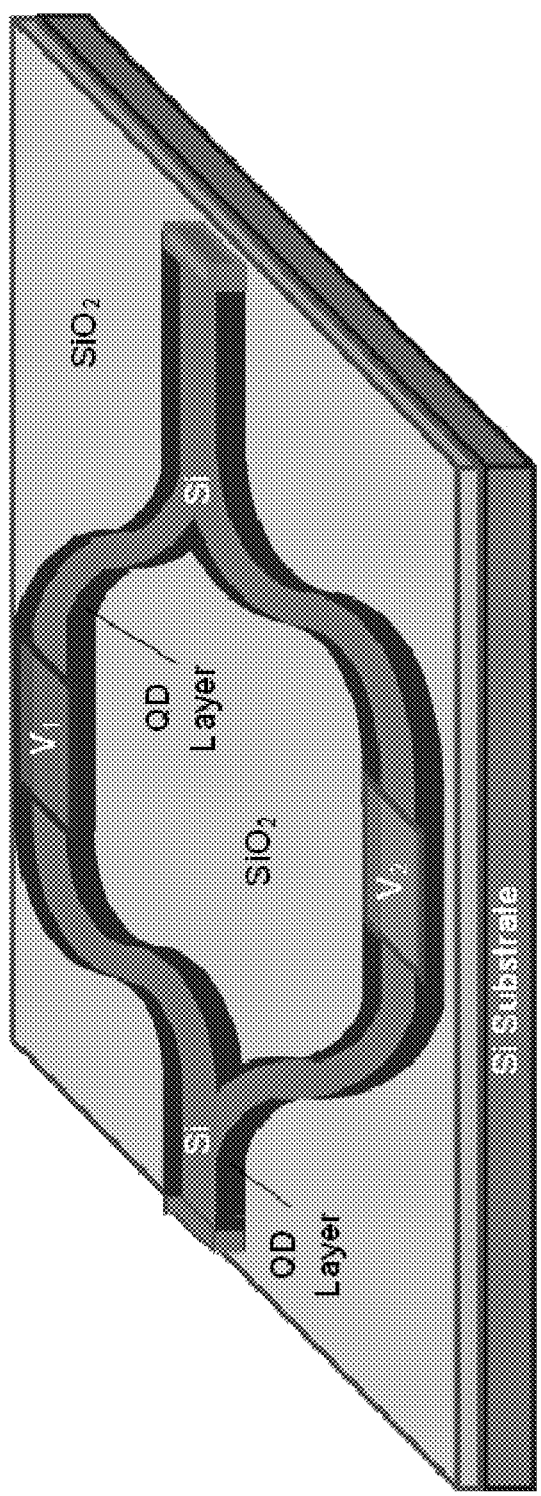
FIG. 9a is a graphical illustration of a Mach-Zehnder interferometer comprising waveguides formed by Si waveguides with lateral claddings formed by self-assembled quantum dots (light blue) where the biasing of lateral cladding may be used to control the operation of the MZI along with conventional voltage control via voltage across waveguide regions shown as V1 and V2, in accordance with an embodiment of the invention.

Referring to FIG. 8, a PBG structure formed by self-assembled quantum dot layer 2 filled by layer of $SiO_2$ grown by PECVD to form upper cladding 6 as well as regions 10 and 100s is shown. Here layer 600 is p-doped and the substrate shown is GaAs 900. Referring to FIG. 9a, a Mach-Zehnder interferometer comprised of waveguides formed by Si waveguides with lateral claddings formed by self-assembled quantum dots (light blue) is shown. It should be appreciated that the biasing of lateral cladding controls the operation of the MZI along with conventional voltage control via voltage across waveguide regions shown as V1 and V2. The Mach-Zehnder interferometer structure here is in contrast to FIG. 4f, where the optical structure is comprised of PBG waveguides formed by self-assembled nanodots. Here, Si optical waveguides are used with quantum dot layer claddings. The index of these lateral and upper cladding layers and regions can be tuned. This advantageously results in changing the effective index in the Si waveguides, thus causing modulation. Moreover, if Si waveguide is replaced by MQWs, direct tuning of Si waveguides can also take place.

Figures 9B, 9C:
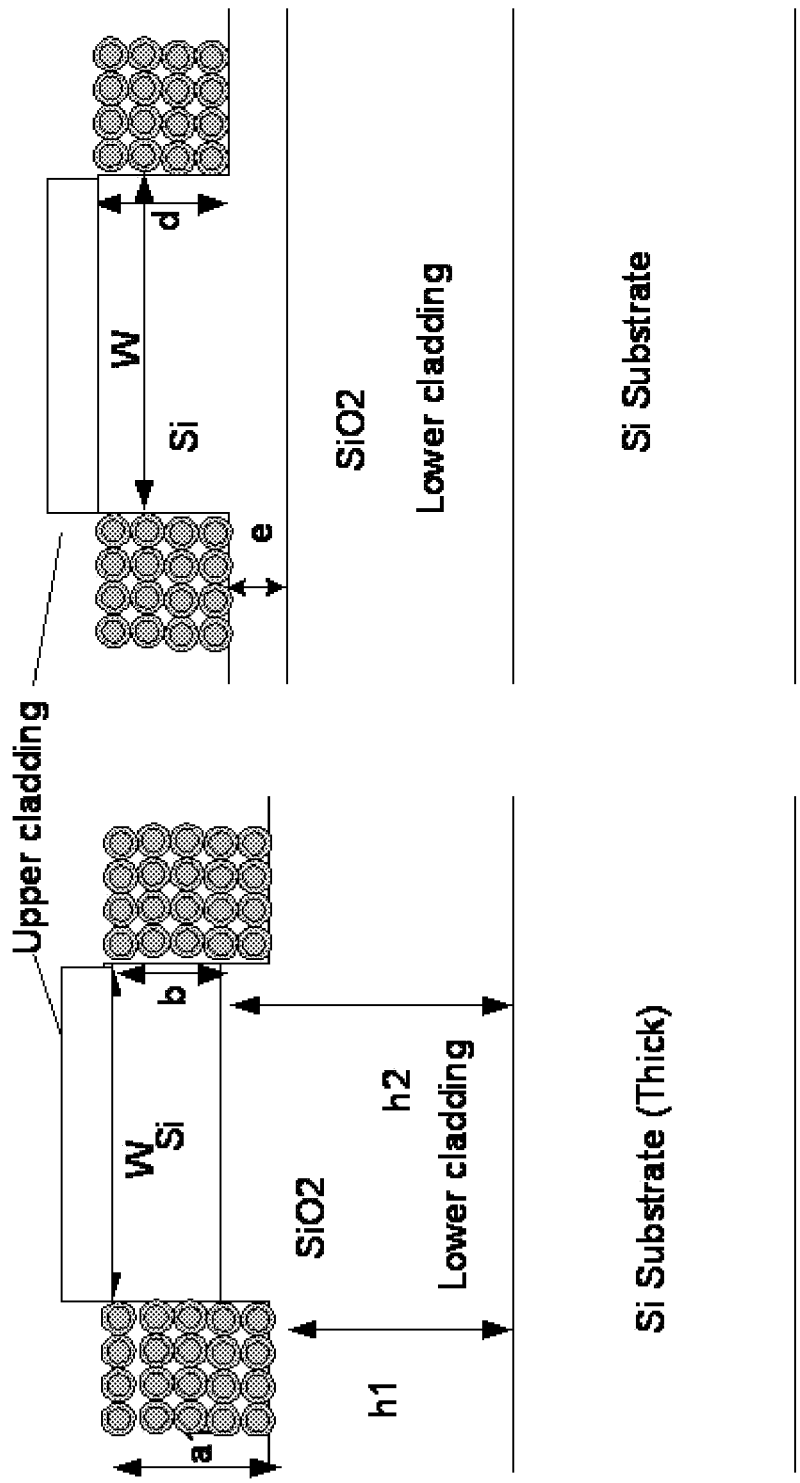
FIG. 9b is a cross-section of one of the waveguide arms of FIG. 9a showing lateral cladding made of QD layer, where the transverse lower cladding is SiO2 and the upper cladding on Si waveguide is air, in accordance with an embodiment of the invention.
FIG. 9c is a cross-section of one of the waveguide arms of FIG. 9a showing lateral cladding made of QD layer which is configured as a ridge waveguide (Note that upper cladding on Si waveguide is not shown explicitly), in accordance with an embodiment of the invention.

Referring to FIG. 9b, a schematic diagram illustrating a cross-section of one of the waveguide arms showing lateral cladding made of QD layer is shown, in accordance with one embodiment of the invention, where the transverse lower cladding is SiO2 and the upper cladding on Si waveguide is air. Referring to FIG. 9c, a schematic diagram illustrating a cross-section of one of the waveguide arms showing lateral cladding made of QD layer is shown, in accordance with one embodiment of the invention, in a ridge waveguide configuration, where the upper cladding on Si waveguide is air.

Figure 9E:
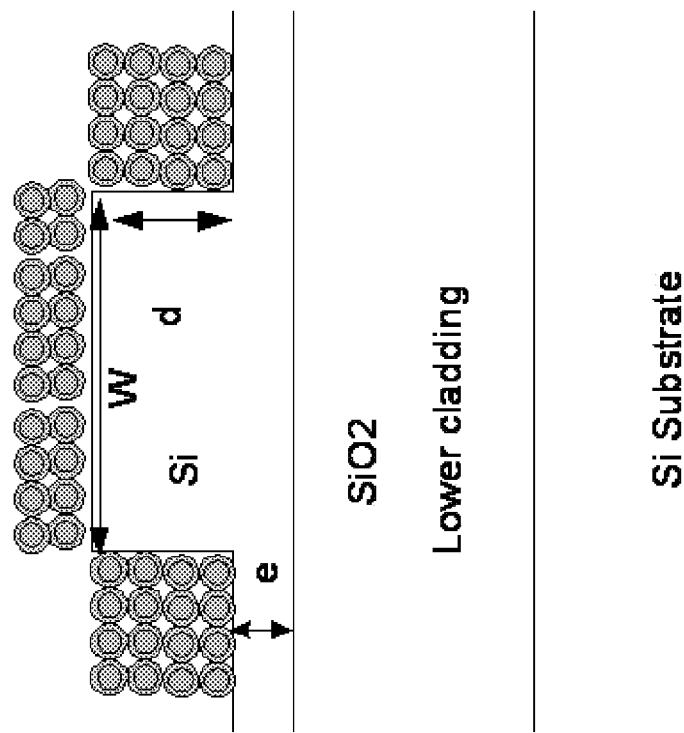
FIG. 9e is a cross-section of the ridge waveguide arms of FIG. 9a showing lateral and upper cladding made of QD layers, in accordance with an embodiment of the invention.
Figure 9D:
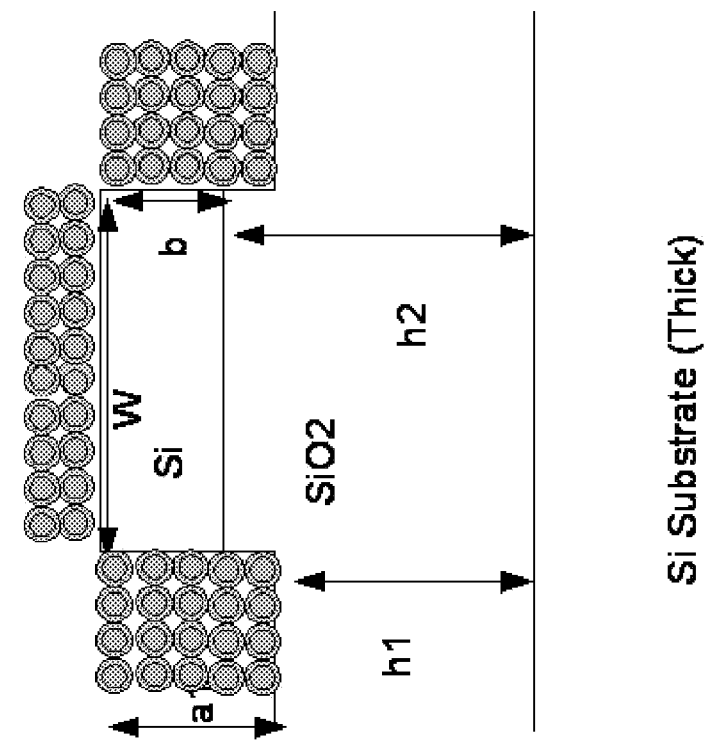
FIG. 9d is a cross-section of one of the waveguide arms of FIG. 9a showing lateral and upper cladding made of QD layers, in accordance with an embodiment of the invention.
Figure 10A:
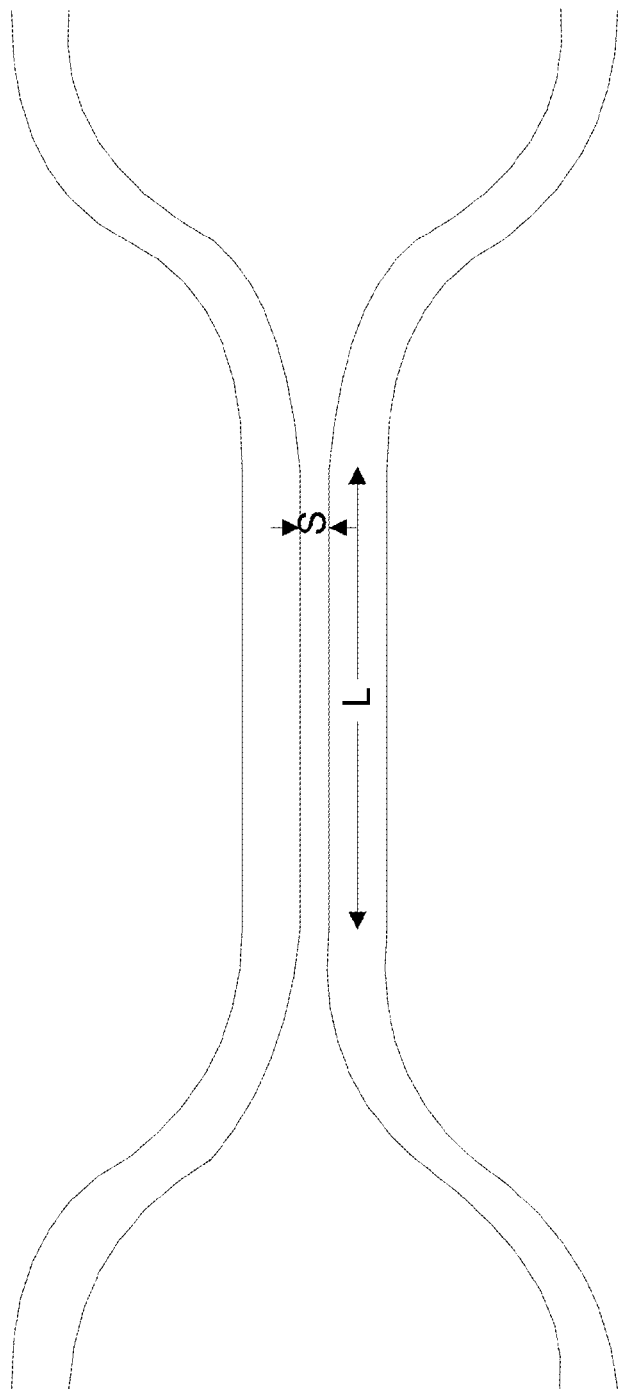
FIG. 10a is a schematic representation of the topology of a directional coupler with spacing S separating two waveguides over a length L, in accordance with the prior art.
Figure 10B:
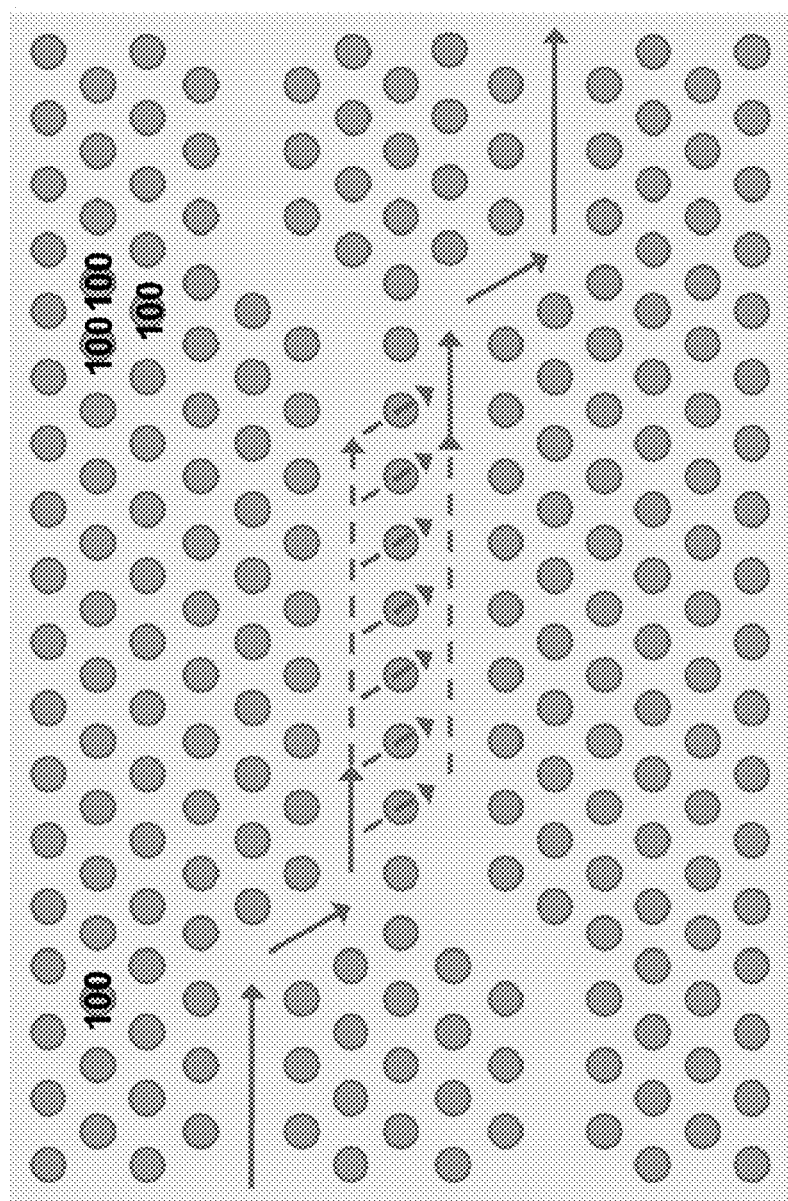
FIG. 10b is a schematic photonic crystal rendition of a directional coupler, in accordance with an embodiment of the invention.

Referring to FIG. 9d, a schematic diagram illustrating a cross-section of one of the waveguide arms showing lateral and upper cladding made of QD layers is shown, in accordance with an embodiment of the invention. Referring to FIG. 9e, a schematic diagram illustrating a cross-section of the ridge waveguide arm with lateral and upper cladding made of QD layers is shown, in accordance with an embodiment of the invention. Referring to FIG. 10a, a topology of a directional coupler with spacing S separating two waveguides over a length L, in accordance with the prior art is shown. Referring to FIG. 10b, a photonic crystal rendition of a directional coupler in accordance with one embodiment of the present invention is shown.

Figure 10C:
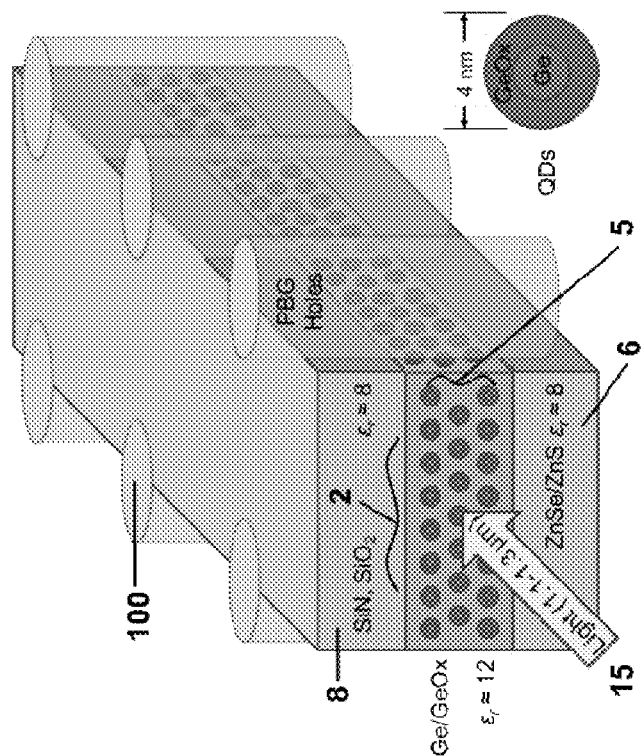
FIG. 10c is a 3-D schematic cross-section of two QD waveguides using PBG configuration to implement a directional coupler, where the waveguides are separated by holes/gaps (it is contemplated that this could be made with more rows of holes and the separation between the two guides can be larger), in accordance with an embodiment of the invention.
Figure 10C:
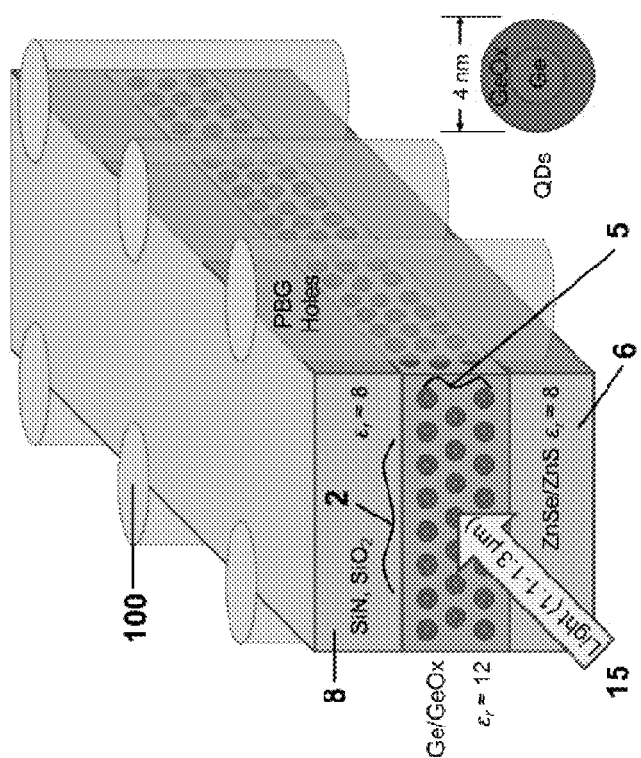
Figure 10D:
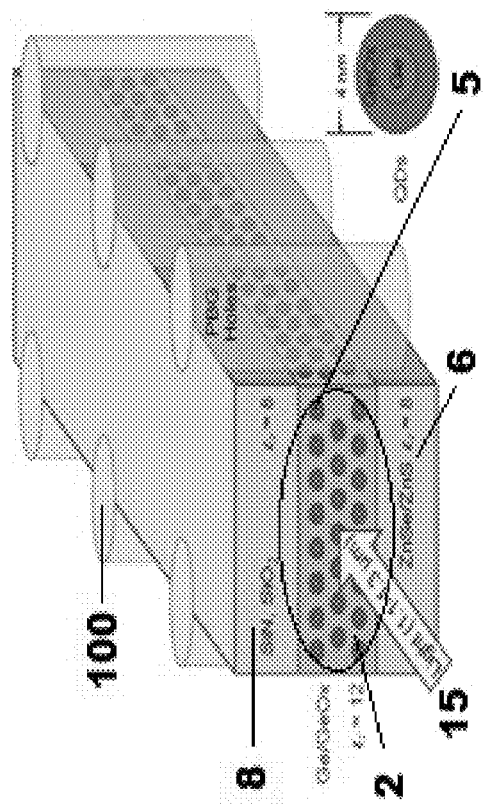
FIG. 10d is a 3-D schematic cross-section of two QD waveguides using PBG configuration to implement a directional coupler serving as an RF modulator, where, in this case, an external voltage is applied on the left side of the structure via top electrode, in accordance with an embodiment of the invention.
Figure 10D:
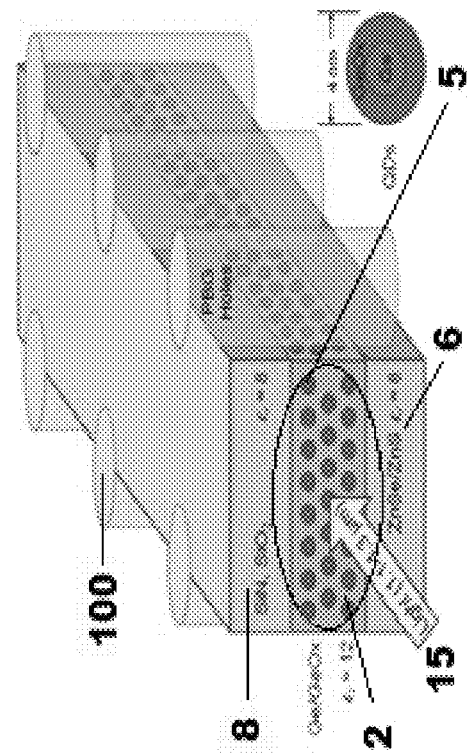

Referring to FIG. 10c, a 3-D schematic cross-section of two QD waveguides using PBG configuration to implement a directional coupler, in accordance with an embodiment of the present invention is shown, where the two waveguides are separated by one line of holes/gaps. This could be made with more rows of holes and the separation between the two guides will be larger. Referring to FIG. 10d, a 3-D schematic cross-section of two QD waveguides using PBG configuration to implement a directional coupler serving as a RF modulator. It should be appreciated that here an external voltage is applied on the left side of the structure via top electrode. The bottom electrode is not shown.

Figure 11:
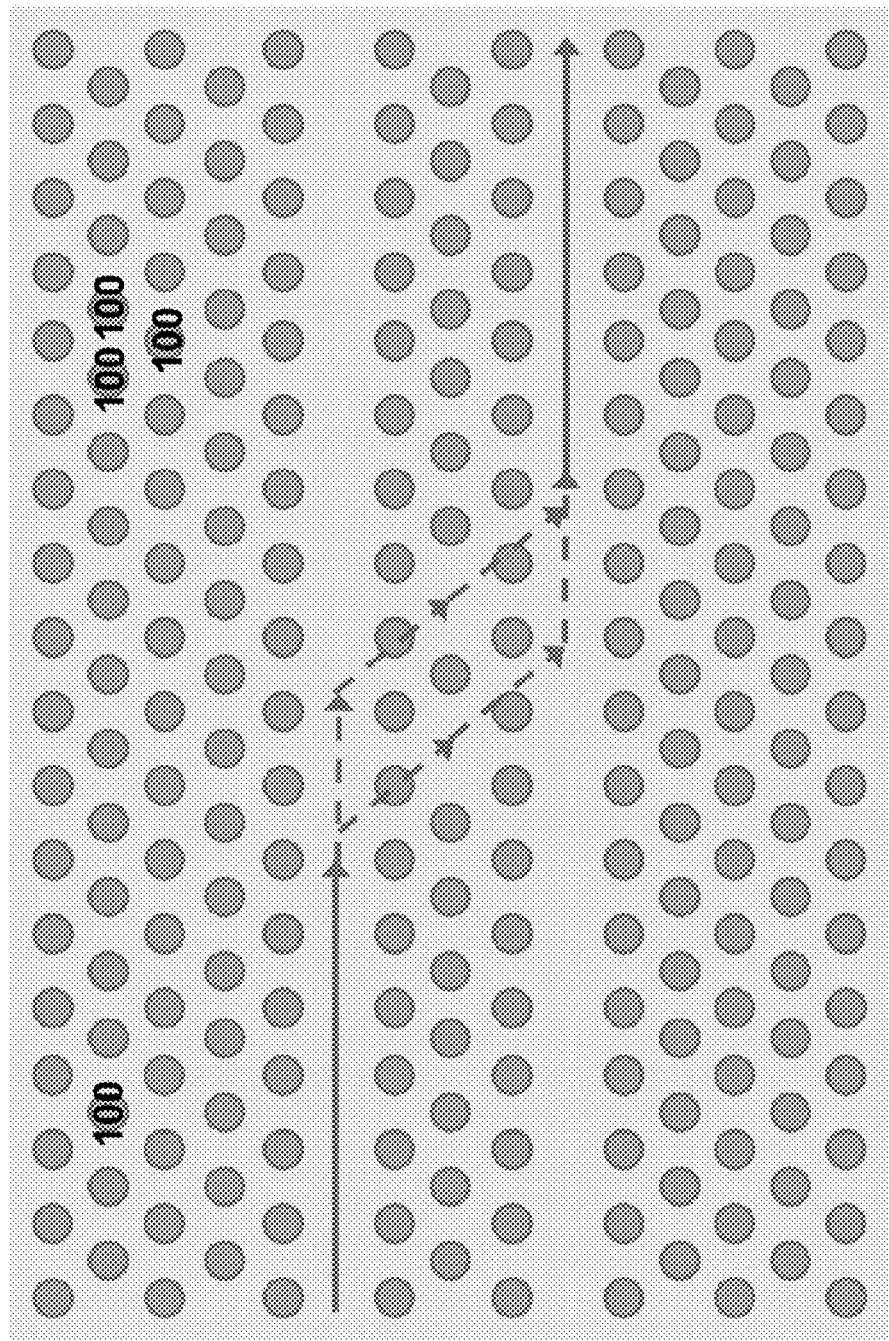
FIG. 11 is schematic photonic crystal rendition of a PBG Channel Drop Filter with holes missing in the region where a certain wavelength signal is transferred to the bottom waveguide, in accordance with an embodiment of the invention.
Figure 12A:
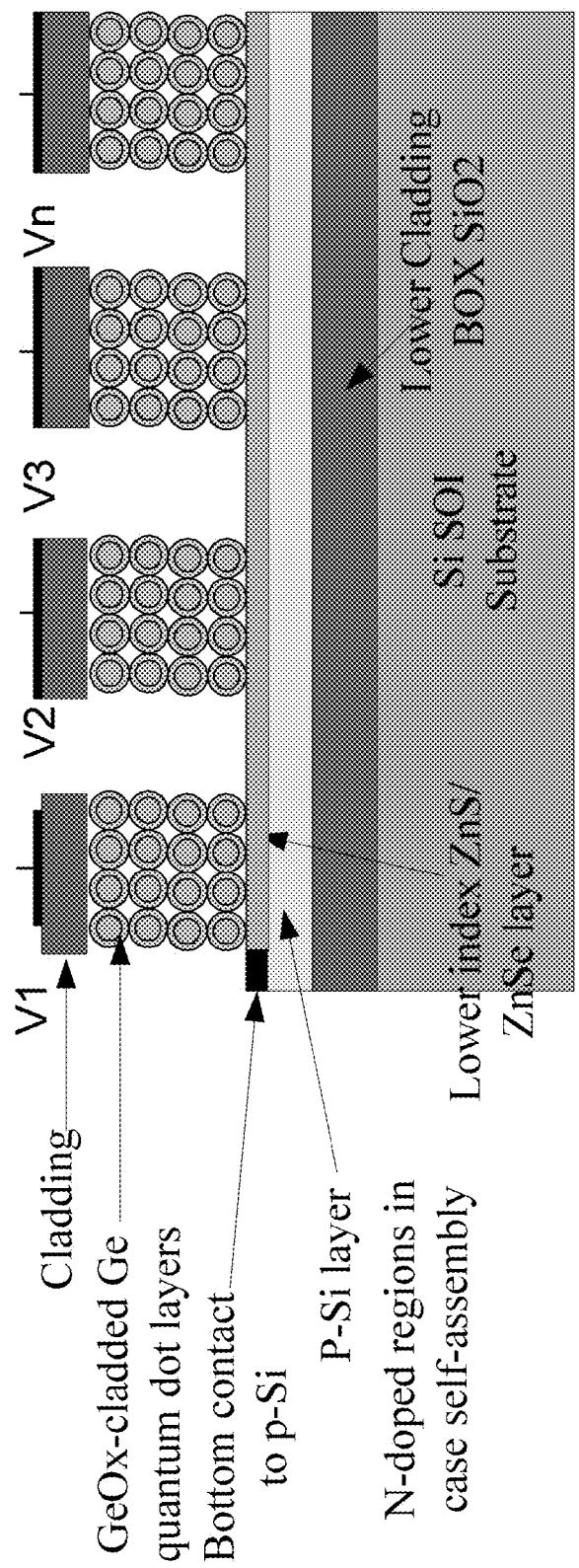
FIG. 12a is a cross-sectional schematic of the tunable photonic demultiplexer device illustrated in FIGS. 6a-6c.
Figure 12B:
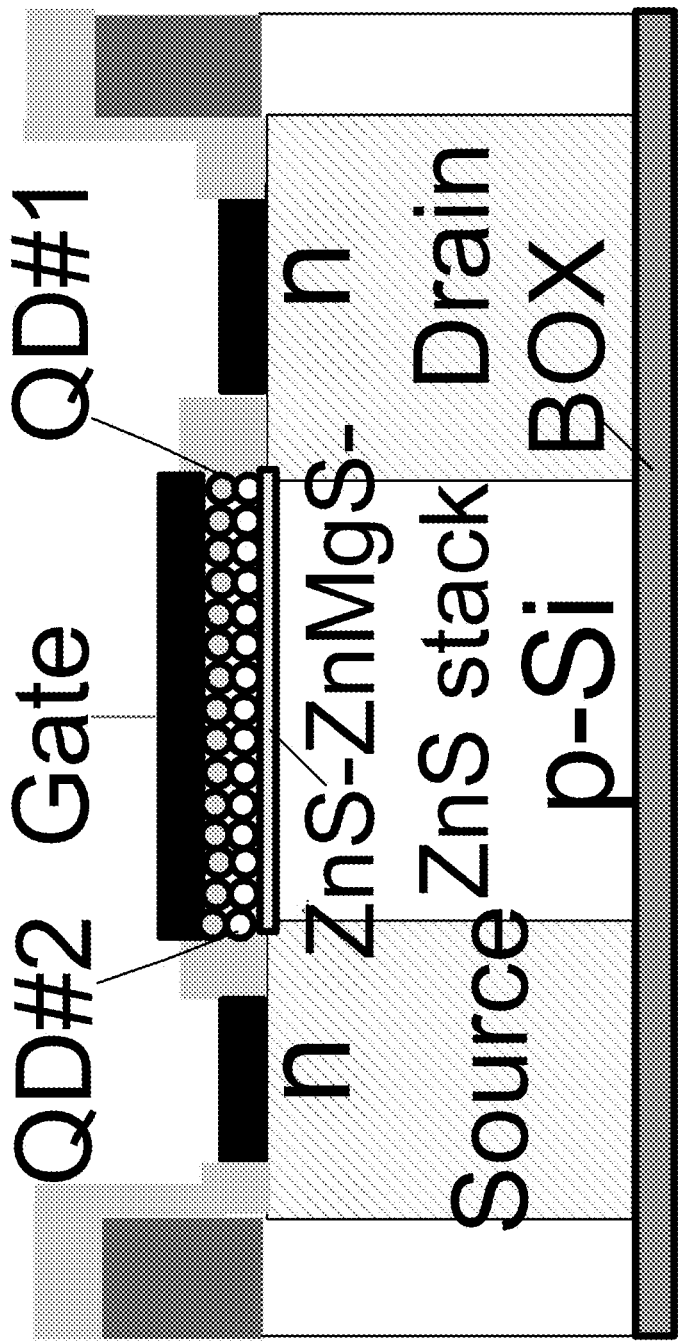
FIG. 12b is a QDG-SOI FET with two different dot layers assembled on a ZnS—ZnMgS—ZnS gate insulator to realize a QDG-FET on SOI Si substrate, where the dot sizes and materials make them asymmetric, in accordance with an embodiment of the invention.

Referring to FIG. 11, a 3D representation of a PBG Channel Drop Filter, in accordance with an embodiment of the invention is shown. It should be appreciated that the holes missing in the region allow a certain wavelength signal to be transferred to the bottom waveguide. Referring to FIG. 12a, a cross-sectional schematic diagram of a tunable photonic demultiplxer device, in accordance with an embodiment of the invention is shown. Referring to FIG. 12b, a cross-sectional schematic diagram of a QDG-SOI FET with two different dot layers assembled on ZnS—ZnMgS—ZnS gate insulator, in accordance with an embodiment of the invention is shown, where the dot sizes and materials make them asymmetric.

Figure 13A:
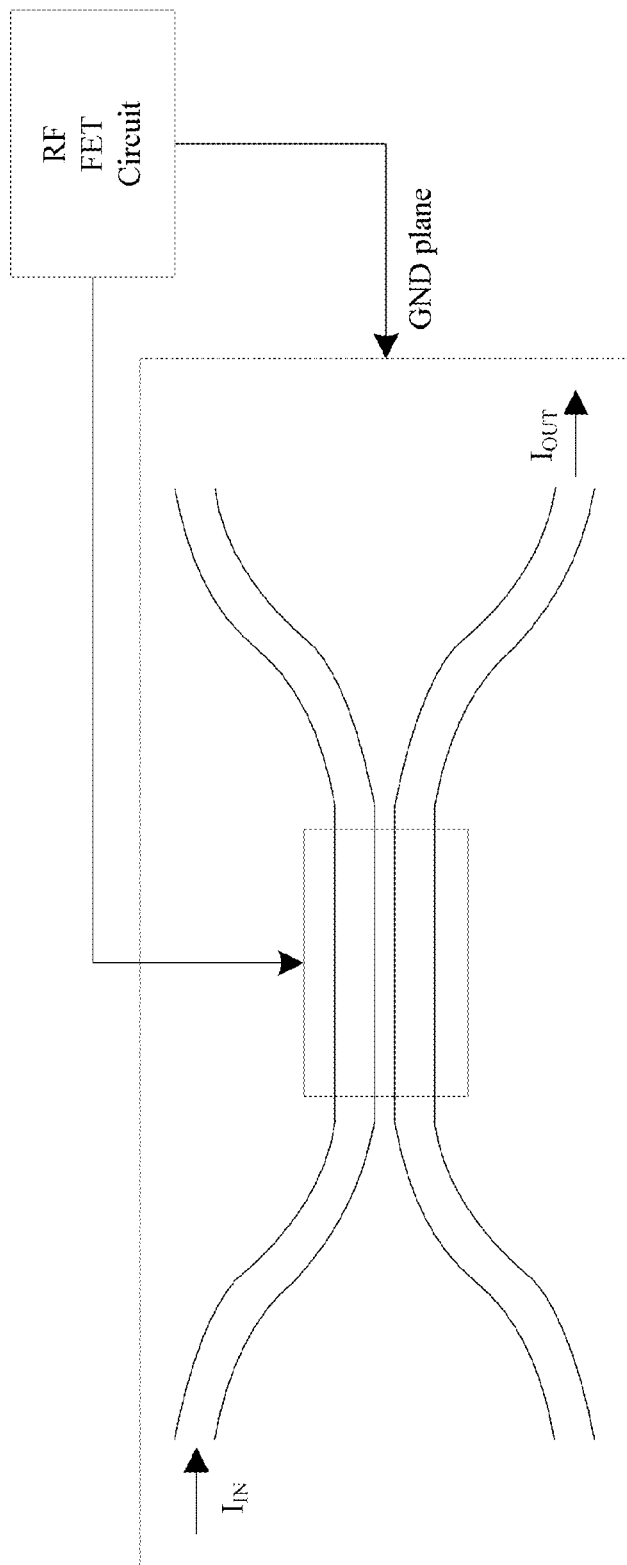
FIG. 13a is a schematic representation of a directional coupler having the configuration of FIG. 9a integrated with a RF circuit using field-effect transistors (FETs) realized on the same substrate to implement the modulator driver circuits, in accordance with an embodiment of the invention.

It should be appreciated that quantum dot gate FETs and nonvolatile memories as well as quantum dot channel FETs with integration of field-effect transistor based electronic circuits with photonic devices to implement optical modulators and tunable and reconfigurable multiplexers and demultiplexers are shown FIGS. 13a-13d. Referring to FIG. 13a, a schematic diagram of a directional coupler (configured as this in FIG. 9a) integrated with a RF circuit using field-effect transistors (FETs) realized on the same substrate to implement the modulator driver circuits, in accordance with an embodiment of the invention is shown.

Figure 13B:
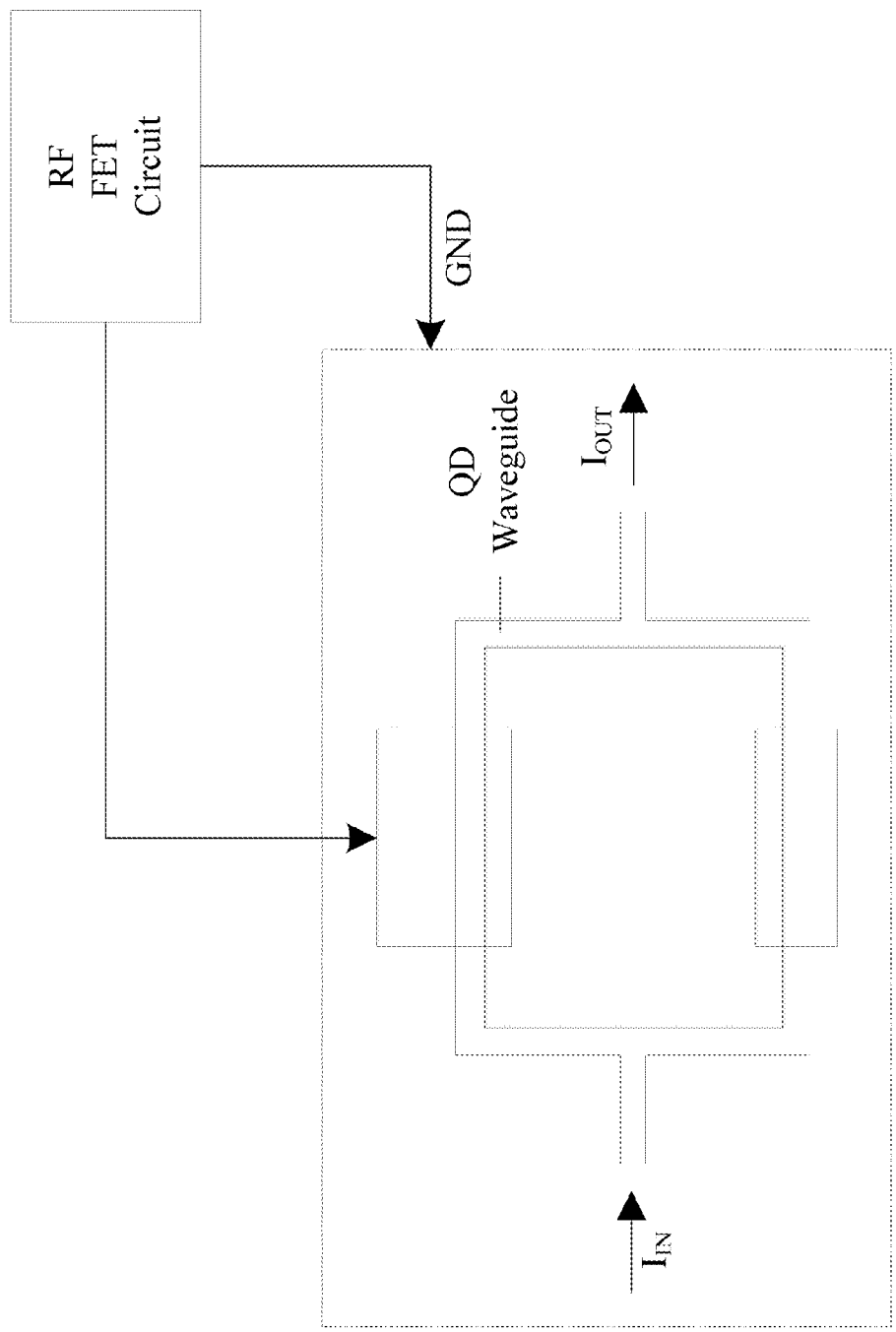
FIG. 13b is a schematic representation of an integrated Mach-Zehnder modulator (without photonic crystal structure, using waveguides configured as in FIG. 9a) integrated with Si FET based driver circuits for modulation, in accordance with an embodiment of the invention.
Figure 13C:
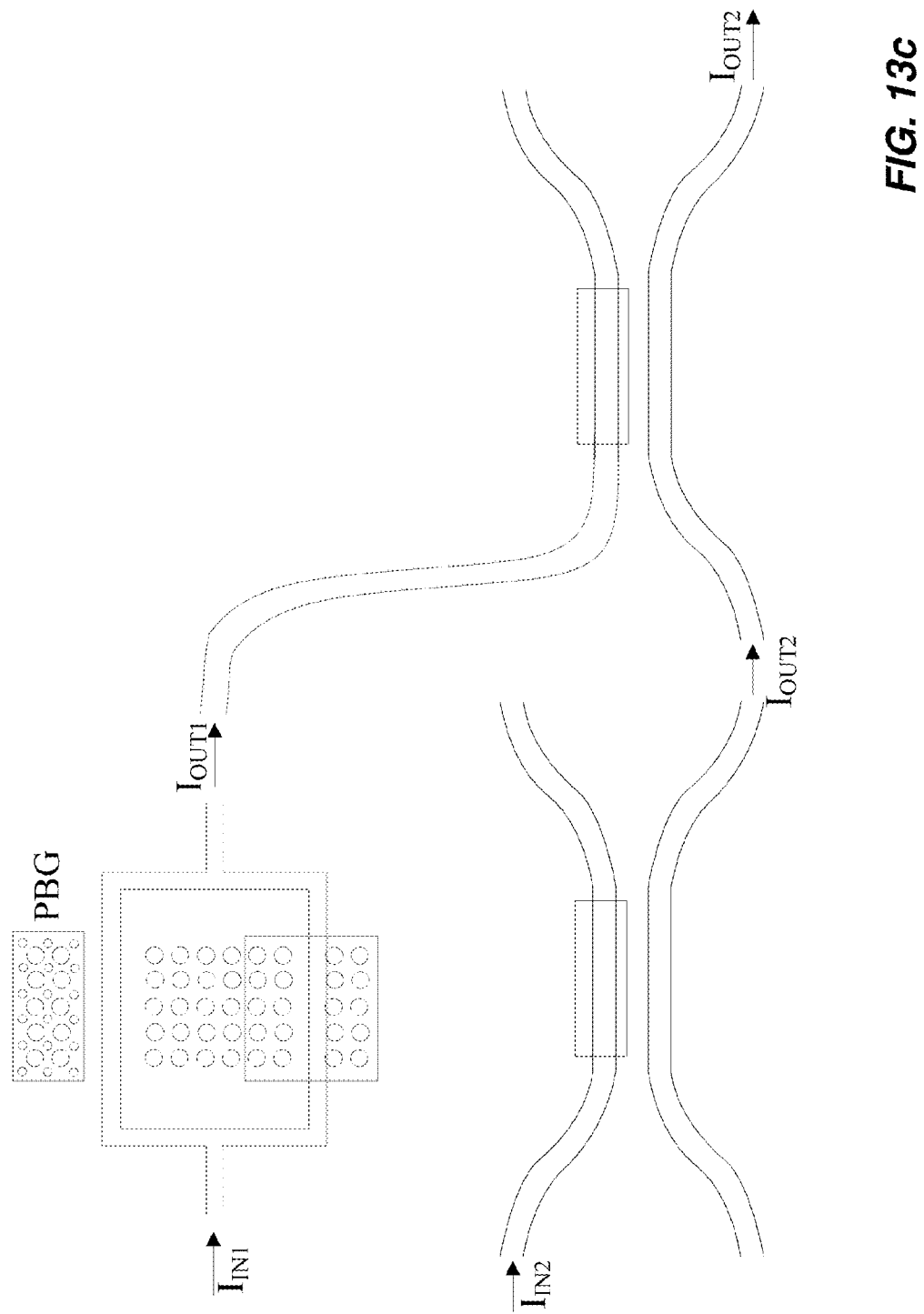
FIG. 13c is a schematic representation of an integrated Mach-Zehnder modulator (with photonic crystal structure, using waveguides like that in FIG. 4f) and two directional coupler modulators (like that of FIG. 9a) integrated with Si FET based driver circuits for modulation and routing, in accordance with an embodiment of the invention.
Figure 13D:
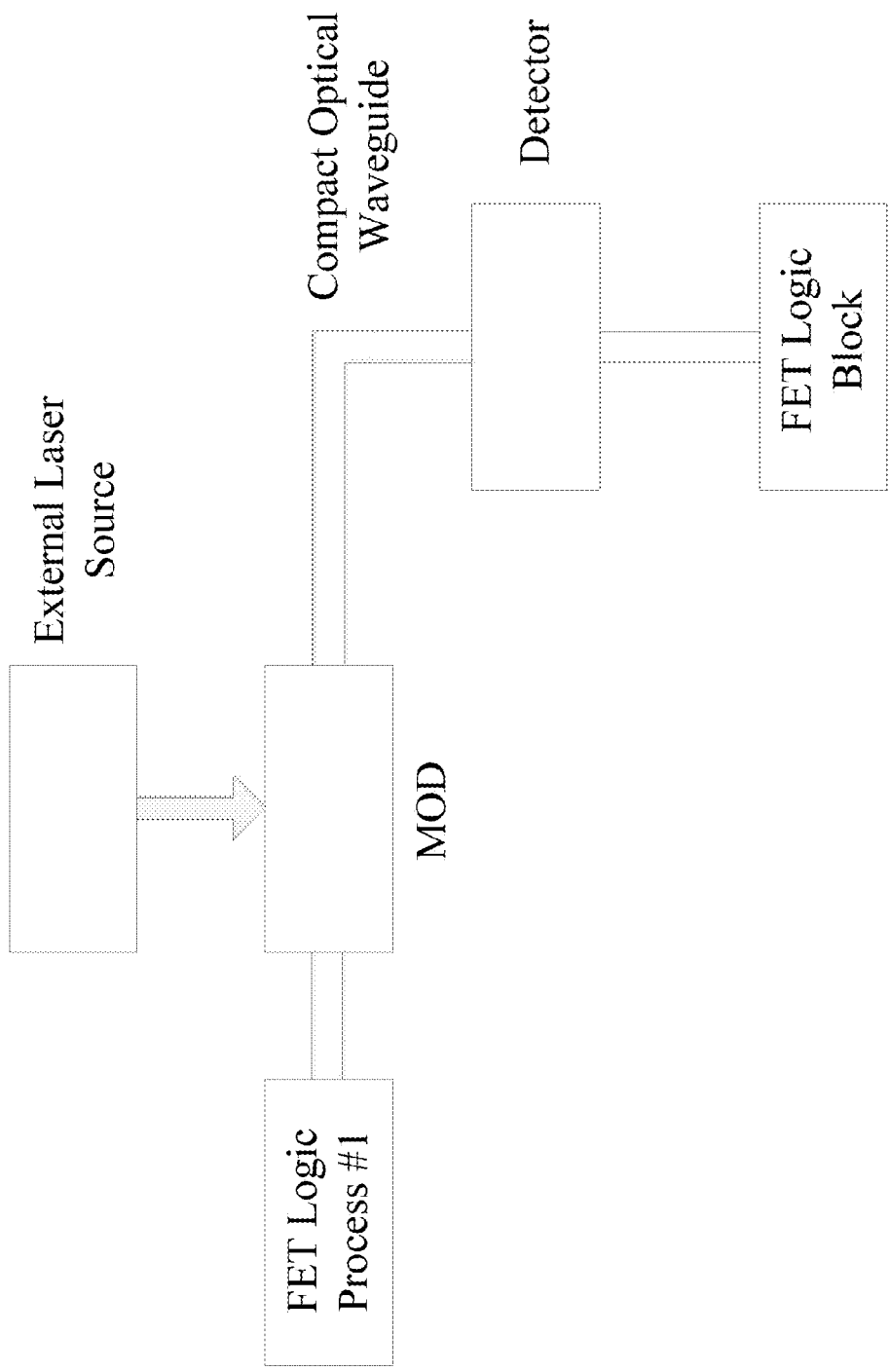
FIG. 13d is a schematic block diagram illustrating photonic devices used as optical interconnects to enhance the performance of nanoelectronic integrated circuit chips such as microprocessors and microcontrollers, in accordance with an embodiment of the invention.

Referring to FIG. 13b, a schematic diagram of an integrated Mach-Zehnder modulator (without photonic crystal structure, using waveguides configured like that of FIG. 9a) integrated with Si FET based driver circuits for modulation, in accordance with an embodiment of the invention is shown. Referring to FIG. 13c, a schematic diagram of a Mach-Zehnder modulator (with photonic crystal structure, using waveguides like FIG. 4f) and two direction couple modulator (configured as in FIG. 9a) integrated with Si FET based driver circuits for modulation and routing, in accordance with an embodiment of the invention is shown. Referring to FIG. 13d, a schematic block diagram showing photonic devices used as optical interconnects to enhance the performance of nanoelectronic integrated circuit chips such as microprocessors and microcontrollers, in accordance with an embodiment of the invention is shown.

In one embodiment the lateral photonic crystal and PBG region is implemented by quatnum dot layer while the main waveguide is realized in conventional Si structure such as shown in Ref. 5 (prior art FIG. 1). This structure would have greater versatility and lower power for electrical control for devices such as MZI modulators.

Still in another embodiment the quantum dot waveguide and lateral cladding are realized on very thin patterned Si layer with box oxide cladding. This is shown in FIG. 14. Here, the p-type Si layer 1300 (see FIG. 4b, this layer is 13) is thin 20-50 nm and has patterned n-regions 7. Now if site-specific self-assembly is use, cladded Si or Ge or Si/Ge layers can be deposited as shown layer 2. Since the Si layer 1300 (in FIG. 4b it is layer 13) is so thin, the box oxide (SiO2) 14 serves as the lower cladding 61 (see FIG. 4b). Note that layer 61 is II-VI high energy gap and lower index of refraction layer. In this embodiment, the need of II-VI growth is avoided. However, the II-VI layer in homogenous form or in Multiple quantum well form can be grown on n-regions, shown as 10, to create control of index of refraction of lateral cladding regions.

The integration of on-chip lasers is also envisioned. This is due to the use of II-VI layers on Si. These layers provide access to III-V layers in selective regions to implement 1.3-1.5 micron lasers. The photodiode integration has been demonstrated in prior art reference 13.

We claim:

1. A photonic waveguide having three layers,
a top layer having a top layer index of refraction (TIOR);
a bottom layer having a bottom layer index of refraction (BIOR); and
a middle layer, wherein the middle layer is located between the top layer and the bottom layer,
wherein at least one of the top layer, bottom layer and middle layer is configured such that when an Electromagnetic Energy (EME) having an EME wavelength is introduced into the middle layer, the EME is waveguided in the transverse direction, and wherein the middle layer includes at least one middle layer index of refraction (MIOR), wherein the at least one MIOR is greater than the TIOR and the BIOR, and
wherein the top layer, bottom layer and middle layer are deposited on a substrate which is constructed from at least one of Si, Ge, Si-on-Insulator, Si-on-sapphire, GaAs, InP, ZnSe, and LiNbO3, and
wherein the middle layer is constructed of an array of cladded quantum dots, wherein the cladded quantum dots include a dot core having a diameter of about 3 nm to about 5 nm and a dot cladding having a cladding thickness in the range of about 1 nm to about 3 nm,
wherein the dot core is constructed from a material having a dot core energy gap and a dot core index of refraction, and
wherein the dot cladding is constructed from a material having a dot cladding energy gap and a dot cladding index of refraction,
wherein the dot core energy gap is smaller than the dot cladding energy gap and wherein the dot core index of refraction is larger than the dot cladding index of refraction, and,
wherein the array of cladded quantum dots includes an effective index of refraction (EIOR) and an effective absorption coefficient, wherein the EIOR and the effective absorption coefficient is responsive to the EME wavelength, and
wherein the MIOR includes properties that are responsive to at least one of an electric field and an electromagnetic field, and
wherein the dot core is constructed from a material selected from at least one of Si, Ge, combination of Si and Ge, II-VI and III-V semiconductors, and any combination thereof, and
wherein the dot cladding is constructed from a material selected from at least one of SiOx, GeOx, II-VI and III-V materials, and any combination thereof, and
wherein the top layer is deposited on one side of the middle layer and is constructed from a material selected from at least one of SiO2, Si3N4, SiON, and at least one material having an index of refraction lower than the EIOR and an energy gap higher than the dot core energy gap, and
wherein the bottom layer is deposited on the other side of the middle layer and is constructed from a material selected from at least one of SiO2, Si3N4, SiON, and at least one material having an index of refraction lower than the EIOR and an energy gap higher than the dot core energy gap, and an electrode material layer deposited on the top layer and the bottom layer, and
wherein the EME is confined in the lateral direction within the middle layer by at least one of,
a photonic crystal structure having at least one of a two-dimensional and three-dimensional photonic crystal lattice,
a ridge waveguide, and
a rib waveguide
said waveguiding structure comprising of middle waveguide layer, top and bottom cladding layer realized in conjunction with either lower index refraction cladding regions or photonic crystal structure along the lateral sides adjoining the waveguiding structure.

2. The photonic waveguide of claim 1, wherein the at least one of the rib and ridge waveguides are separated by a gap across an interaction region for the purpose of transfer of light from one photonic waveguide to the other.

3. The photonic waveguide of claim 2, wherein an external electric field is applied across one waveguide in the interaction region to facilitate voltage modulation of an incident light beam.

4. The photonic waveguide of claim 1, wherein a photonic Mach-Zehnder interferometer modulator is formed by the at least one of the rib and ridge waveguides and where the separation of the rib and ridge waveguides is such that no coupling of light between the rib and ridge waveguides takes place, and with the application of an external electric field across one of the two waveguides results in modulation of incident light which is split in this interferometric device.

5. The photonic waveguide of claim 1, wherein the photonic waveguide is implemented in a photonic crystal structure, resulting in a demultiplexer,
wherein at least one of the waveguides comprise alternate defect couple cavity waveguide (AD-CCW) structures,
said AD-CCW structure comprising cavities formed by selectively reducing hole dimensions in relation to those of the host photonic crystal along row of holes of predetermined length.

6. The photonic waveguide of claim 5, wherein an electric field is applied across the region surrounding an AD-CCW to implement a tunable demultiplexer.

7. The photonic waveguide of claim 1, wherein the photonic waveguide is implemented in a photonic crystal structure, resulting in a channel-drop filter.

8. The photonic waveguide of claim 1, wherein an incident light beam is routed by electrically selecting a path through application of a voltage across the various waveguides forming the structure.

9. The photonic waveguide of claim 1, further including integrated electronic circuits along with field-effect transistors (FETs) and quantum dot gate FETs to provide various electronic functions.

10. A nanophotonic waveguide comprising three layers, wherein the three layers include a middle layer between an upper cladding layer and a bottom cladding layer, wherein the middle layer includes an effective index of refraction which is higher than the upper and bottom cladding layers and regions vertically and laterally adjacent to the middle layer,
said three layers are deposited on a substrate which is selected from Si, Ge, Si-on-Insulator, Si-on-sapphire, GaAs, InP, ZnSe, and LiNbO3,
said middle layer serving as the waveguiding layer where photons are confined in the transverse directions by lower index of refraction regions or photonic crystal structure comprising of 2-dimensional or 3-dimensional lattice photonic band gap structures,
said middle waveguiding layer is made of semiconductor selected from Si, Ge, $Si_xGe_{1-x}$, III-VI and II-VI semiconductors, said three layers forming the waveguide are surrounded in the lateral direction by a layer or regions comprised of at least one array of cladded quantum dots, wherein each of the cladded quantum dots include a dot core with a dot core energy gap and a diameter in the range of about 3 nm to about 5 nm and a dot cladding having an energy gap higher than the dot core energy gap and a cladding thickness in the range of about 1 nm to about 3 nm, wherein the quantum dot layer includes optical parameters that include an effective index of refraction, a coefficient of absorption at a given light wavelength which depends on relative core diameter, a cladding thickness and the materials of quantum dots comprising a middle layer, wherein the quantum dot layer optical parameters can be altered by applying an external voltage and its associated electric field, wherein the dot core is constructed from a material selected from at least one of Si, Ge, combination of Si and Ge, II-VI and III-V semiconductors, wherein the dot cladding is selected from $SiO_x$, $GeO_x$, II-VI and III-V materials, the quantum dot layer having on top an electrode material layer for the purpose of applying an external voltage bias and/or signal for modulation, the layer or regions of at least one array of cladded quantum dots having on a bottom side an electrode material layer for the purpose of applying an external voltage bias and/or signal for modulation, wherein the electrode material layer on the bottom side of the layer or regions of at least one array of cladded quantum dots is configured to apply the external electric field.

11. The waveguide structure of claim 1, wherein the waveguide structure is configured as directional coupler.

12. The waveguide structure of claim 10, wherein the waveguide structure is configured as a Mach-Zehnder modulator.

13. The waveguide structure of claim 10, wherein the waveguide structure is configured as a wavelength demultiplexer and multiplexer.

14. The waveguide structure of claim 10, wherein the waveguide structure is configured as channel drop filter.

15. The waveguide structure of claim 10, further comprising nanoelectronic devices.

16. A nano-photonic waveguide comprising of three layers, a top cladding layer having a top layer effective index of refraction, a bottom cladding layer having a bottom layer effective index of refraction and a middle layer, wherein the middle layer includes an effective index of refraction that is higher than the top and bottom effective index of refraction and regions adjacent to it vertically as well as laterally, said three layers are deposited on a substrate which is selected from Si, Ge, Si-on-Insulator, Si-on-sapphire, GaAs, InP, ZnSe, and LiNbO3 said middle layer serving as the waveguiding layer where photons are confined in the transverse directions by regions characterized by lower index of refraction or photonic crystal structure comprising of two-dimensional or three-dimensional lattice photonic crystals, said middle waveguiding layer is composed of a plurality of cladded quantum dots configured as an array of cladded quantum dots, wherein each of the plurality of cladded quantum dots include a core with a core energy gap and with diameter in the range of about 3 nm to about 5 nm and a cladding having an energy gap higher than the core energy gap and a cladding thickness in the range of about 1 nm to about 3 nm, wherein the middle layer has optical parameters that include an effective index of refraction, and a coefficient of absorption at a given light wavelength, wherein their magnitude is dependent on relative core diameter, the cladding thickness and the materials of quantum dots comprising the middle layer, wherein the optical parameters are alterable by applying an external voltage and an associated electric field, wherein the core is constructed from a material selected from at least one of Si, Ge, combination of Si and Ge, II-VI and III-V semiconductors, wherein the cladding on cladded quantum dots is constructed from a material selected from at least one of SiOx, GeOx, II-VI and III-V materials, wherein the top cladding layers is deposited above the middle layer and is selected from at least one of SiO2, Si3N4, SiON, wherein the bottom cladding layer is deposited below the middle layer and is constructed from a material selected from at least one of SiO2, Si3N4, SiON, wherein the top and bottom cladding layers include an electrode material layer for the purpose of applying an external voltage bias and/or signal for modulation, wherein the top cladding layer is deposited with an electrode layer to apply external voltages, wherein the substrate or bottom cladding layer includes a deposited electrode through which to apply the external electric field.

17. The photonic waveguide of claim 1, wherein the EME is confined in the lateral direction within the middle layer by a photonic crystal structure having a two-dimensional (2-D) photonic crystal lattice, said 2-D photonic crystal lattice, comprising a periodic square or triangular lattice of circular columns characterized internally by a different index of refraction than the surrounding material, hereafter referred to as holes, and wherein holes comprise of lower index material selected from air, SiO2, Si3N4, SiON, cladded quantum dots, SiOx-Si and GeOx-Ge.

18. The nano-photonic waveguide of claim 16, further comprising a middle waveguide layer, top and bottom cladding layer realized in conjunction with at least one of a material having a lower index refraction than the cladding regions or a photonic crystal structure along the two lateral sides adjoining the nano-photonic waveguide.

19. The waveguide structure of claim 15, wherein the nanoelectronic devices include field-effect transistor circuits on same substrate.

* * * * *